US012182691B1

(12) United States Patent
Amirineni et al.

(10) Patent No.: US 12,182,691 B1
(45) Date of Patent: Dec. 31, 2024

(54) INCREASING PERFORMANCE OF COMPUTATIONAL ARRAY ACCELERATORS

(71) Applicant: Amazon Technologies, Inc., Seattle, WA (US)

(72) Inventors: Sundeep Amirineni, Cedar Park, TX (US); Akshay Balasubramanian, Austin, TX (US); Joshua Wayne Bowman, Austin, TX (US); Ron Diamant, Santa Clara, CA (US); Paul Gilbert Meyer, Jericho, VT (US); Thomas Elmer, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 871 days.

(21) Appl. No.: 17/249,900

(22) Filed: Mar. 17, 2021

(51) Int. Cl.
*G06N 3/063* (2023.01)
*G06F 7/544* (2006.01)
*G06F 9/30* (2018.01)

(52) U.S. Cl.
CPC .......... *G06N 3/063* (2013.01); *G06F 7/5443* (2013.01); *G06F 9/3001* (2013.01)

(58) Field of Classification Search
CPC ...... G06N 3/063; G06F 7/5443; G06F 9/3001
See application file for complete search history.

(56) References Cited

U.S. PATENT DOCUMENTS 4,616,330 A * 10/1986 Betz .................... G06F 7/5443 708/626
5,717,700 A * 2/1998 Crouch .......... G01R 31/318536 714/726
2003/0145030 A1* 7/2003 Sheaffer ............... G06F 9/3001 712/E9.071
2015/0372666 A1* 12/2015 Escobar ................ H03K 5/133 327/276
2016/0125102 A1* 5/2016 Shauck ................ G06F 30/394 716/103
2017/0270245 A1* 9/2017 van Rooyen .......... G16B 50/40
2019/0197019 A1* 6/2019 Patil ...................... G06F 17/11
2020/0019847 A1* 1/2020 Krishnamurthy ....... G06F 17/16
2020/0202198 A1* 6/2020 Lee ........................ G06N 3/08
2021/0357736 A1* 11/2021 Lu ......................... G06N 3/045

* cited by examiner

*Primary Examiner* — Farley Abad
(74) *Attorney, Agent, or Firm* — Weaver Austin Villeneuve & Sampson LLP

(57) ABSTRACT

To improve performance of a computational array, the architecture of the array can be modified to allow the processing engines of a column to operate in parallel and the clock frequency of the array to be increased. The processing engines of each column of the array can be grouped into a series of row groups. The processing engines of each row group can be loaded with input values, and computations on the input values can be carried out in parallel to generate the column output. One or more flip-flop stages can be inserted into the computational logic of each of the processing engines. The computational logic can then be distributed across the flip-flop stages to reduce the propagation delay between flip-flop stages of the processing engine, hence allowing the clock frequency of the array to be increased.

20 Claims, 14 Drawing Sheets

1000
$i_{rg0\text{-}0}$ rg0$_0$
$i_{rg0\text{-}1}$ rg0$_1$
$i_{rg0\text{-}n}$ rg0$_n$
1002-1
$i_{rg1\text{-}0}$ rg1$_0$
$i_{rg1\text{-}1}$ rg1$_1$
$i_{rg1\text{-}n}$ rg1$_n$
1002-2
$i_{rgn\text{-}0}$ rgn$_0$
$i_{rgn\text{-}1}$ rgn$_1$
$i_{rgn\text{-}n}$ rgn$_n$
1002-n
ACCUMULATOR
1004
column output

INCREASING PERFORMANCE OF COMPUTATIONAL ARRAY ACCELERATORS

BACKGROUND

The architecture of a neural network is composed of different layers, including an input layer, an output layer, and a number of intermediate layers, often referred to as hidden layers. Each layer executes computations on the outputs of the previous layer, with the last layer (the output layer) providing a final result. With more layers, a neural network can, theoretically, perform more complex tasks, such as language translations and identifying (or classifying) the contents of an image. Deep neural networks can have many hidden layers, such as, for example, between five and more than a thousand layers. Execution of a neural network can involve millions of numeric calculations. Although such calculations can be performed by general-purpose processors, general-purpose processors are typically not optimized for neural network computations, resulting in poor response times. Computational arrays that are optimized for parallel computations can be more efficient and effective than general-purpose processors when executing neural networks.

BRIEF DESCRIPTION OF THE DRAWINGS

Various embodiments in accordance with the present disclosure will be described with reference to the drawings, in which.

DETAILED DESCRIPTION

The performance of computational arrays that have processing engines arranged in rows and columns (e.g., systolic arrays used in neural network and machine learning hardware accelerators) is largely dependent on the clock frequency that the computational array operates at. Increasing the clock frequency can proportionally increase the number of trillion floating point operation per second (TFLOPS) executed by the computational array. However, the clock frequency is limited by the propagation delay of the computation logic in the processing engines that make up the array.

To improve performance (e.g., number of TFLOPS) of a computational array, the architecture of the array can be modified to allow the processing engines of a column to operate in parallel and the clock frequency of the array to be increased. The processing engines of each column of the array can be grouped into a series of row groups. The processing engines of each row group can be loaded with input values, and computations on the input values can be carried out in parallel to generate the column output. Furthermore, one or more flip-flop stages can be inserted into the computational logic of each of the processing engines. The computational logic can then be distributed across the flip-flop stages to reduce the propagation delay between flip-flop stages of the processing engine, hence allowing the clock frequency of the array to be increased.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
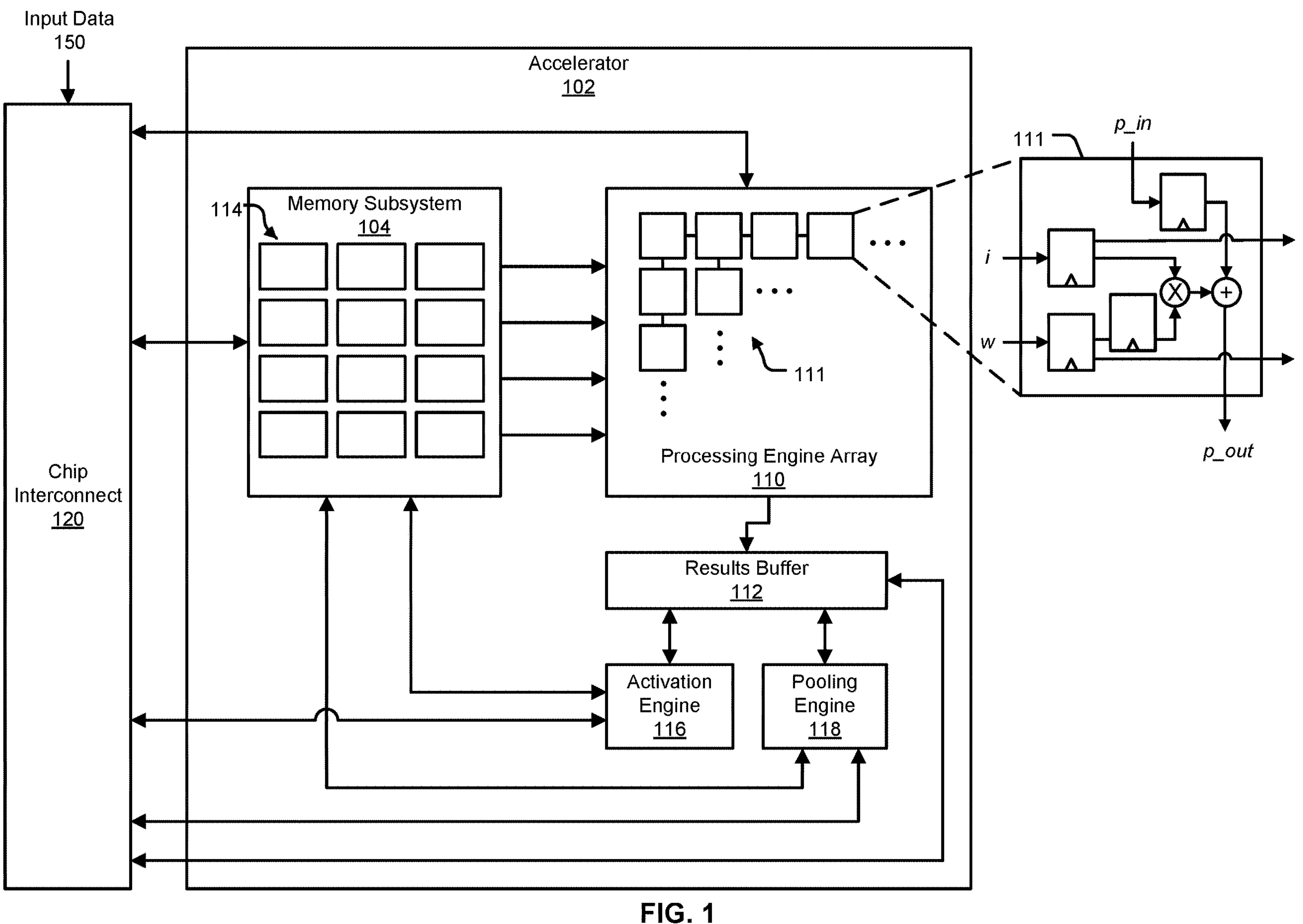
FIG. 1 illustrates a block diagram of an example of an integrated circuit device.

FIG. 1 is a block diagram illustrating an example of an integrated circuit device having a computational array (which may also be referred to as a processing engine array). The example of FIG. 1 illustrates an accelerator 102. In various examples, the accelerator 102, for a set of input data (e.g., input data 150), can execute computations using a processing engine array 110, an activation engine 116, and/or a pooling engine 118. In some examples, the example accelerator 102 may be an integrated circuit component of a processor, such as a neural network processor. The processor may have other integrated circuit components, including additional accelerator engines.

In various implementations, the memory subsystem 104 can include multiple memory banks 114. In these implementations, each memory bank 114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 104 can permit simultaneous access to the read or write channels of multiple memory banks. As another example, the memory subsystem 104 can include arbitration logic such that arbitration between, for example, the outputs of multiple memory banks 114 can result in more than one memory bank's output being used. In these and other examples, though globally managed by the memory subsystem 104, each memory bank can be operated independently of any other.

Having the memory banks 114 be independently accessible can increase the efficiency of the accelerator 102. For example, values can be simultaneously read and provided to each row of the processing engine array 110, so that the entire processing engine array 110 can be in use in one clock cycle. As another example, the memory banks 114 can be read at the same time that results computed by the processing engine array 110 are written to the memory subsystem 104. In contrast, a single memory may be able to service only one read or write at a time. With a single memory, multiple clock cycles can be required, for example, to read input data for each row of the processing engine array 110 before the processing engine array 110 can be started.

In various implementations, the memory subsystem 104 can be configured to simultaneously service multiple clients, including the processing engine array 110, the activation engine 116, the pooling engine 118, and any external clients that access the memory subsystem 104 over a communication fabric 120. In some implementations, being able to service multiple clients can mean that the memory subsystem 104 has at least as many memory banks as there are clients. In some cases, each row of the processing engine array 110 can count as a separate client. In some cases, each column of the processing engine array 110 can output a result, such that each column can count as a separate write client. In some cases, output from the processing engine array 110 can be written into the memory banks 114 that can then subsequently provide input data for the processing engine array 110. As another example, the activation engine 116 and the pooling engine 118 can include multiple execution channels, each of which can be separate memory clients. The memory banks 114 can be implemented, for example, using static random access memory (SRAM).

In various implementations, the memory subsystem 104 can include control logic. The control logic can, for example, keep track of the address spaces of each of the memory banks 114, identify memory banks 114 to read from or write to, and/or move data between the memory banks 114. In some implementations, memory banks 114 can be hardwired to particular clients. For example, a set of memory banks 114 can be hardwired to provide values to the rows of the processing engine array 110, with one memory bank servicing each row. As another example, a set of memory banks can be hard wired to receive values from columns of the processing engine array 110, with one memory bank receiving data for each column.

The processing engine array 110 is the computation matrix of the example accelerator 102. The processing engine array 110 can, for example, execute parallel integration, convolution, correlation, and/or matrix multiplication, among other things. The processing engine array 110 includes multiple processing engines 111, arranged in rows and columns, such that results output by one processing engine 111 can be input directly into another processing engine 111. Processing engines 111 that are not on the outside edges of the processing engine array 110 thus can receive data to operate on from other processing engines 111, rather than from the memory subsystem 104.

In various examples, the processing engine array 110 uses systolic execution, in which data arrives at each processing engine 111 from different directions at regular intervals. Hence, in some implementations, processing engine array 110 may also be referred to as a systolic array. In some examples, input data can flow into the processing engine array 110 from the left and weight values can be loaded at the top. In some examples weights and input data can flow from the left and partial sums can flow from top to bottom. In these and other examples, a multiply-and-accumulate operation moves through the processing engine array 110 as a diagonal wave front, with data moving to the right and down across the array. Control signals can be input at the left at the same time as weights, and can flow across and down along with the computation.

In various implementations, the number of columns in the processing engine array 110 determines the computational capacity of the processing engine array 110, and the number of rows determines the required memory bandwidth for achieving maximum utilization of the processing engine array 110. The processing engine array 110 can have, for example, 64 columns and 128 rows, or some other number of columns and/or some other number rows.

An example of a processing engine 111 (which may also be referred to as a processing element) is illustrated in FIG. 1 in an inset diagram. As illustrated by this example, a processing engine 111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. The input data may also be referred to as feature map input values. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 111.

In the illustrated example, an input from above (e.g., column input) can include a partial sum, p_in, provided either from another processing engine 111 or from a previous round of computation by the processing engine array 110. When starting a computation for a new set of input data, the top row of the processing engine array 110 can receive a fixed value for p_in, such as zero. As illustrated by this example, the weight value w can be preloaded and stored in a weight register. When input data i is shifted into the processing engine 111, i and w are multiplied together and the result is summed with p_in to produce a new partial sum, p_out, which can be input into the next processing engine 111 of the column. Various other implementations of the processing engine 111 are possible.

Outputs from the last row in the processing engine array 110 can be temporarily stored in the results buffer 112. The results can be intermediate results, which can be written to the memory banks 114 to be provided to the processing engine array 110 for additional computation. Alternatively, the results can be final results, which, once written to the memory banks 114 can be read from the memory subsystem 104 over the communication fabric 120, to be output by the system.

In some implementations, the accelerator 102 includes an activation engine 116. In these implementations, the activation engine 116 can combine the results from the processing engine array 110 into one or more output activations. For example, for a convolutional neural network, convolutions from multiple channels can be summed to produce an output activation for a single channel. In other examples, accumulating results from one or more columns in the processing engine array 110 may be needed to produce an output activation for a single node in the neural network. In some examples, activation engine 116 can be bypassed.

In various examples, the activation engine 116 can include multiple separate execution channels. In these examples, the execution channels can correspond to the columns of the processing engine array 110, and can perform an operation on the outputs of a column, the result of which can be stored in the memory subsystem 104. In these examples, the activation engine 116 may be able to perform between 1 and n parallel computations, where n is equal to the number of columns in the processing engine array 110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 102 can include a pooling engine 118. Pooling is the combining of outputs of the columns of the processing engine array 110. Combining can include for example, computing a maximum value, a minimum value, an average value, a median value, a summation, a multiplication, or another logical or mathematical combination. In various examples, the pooling engine 118 can include multiple execution channels that can operating on values from corresponding columns of the processing engine array 110. In these examples, the pooling engine 118 may be able to perform between 1 and n parallel computations, where n is equal to the number of columns in the processing engine array 110. In various examples, execution channels of the pooling engine 118 can operate in parallel and/or simultaneously. In some examples, the pooling engine 118 can be bypassed.

Herein, the activation engine 116 and the pooling engine 118 may be referred to collectively as execution engines. The processing engine array 110 is another example of an execution engine. Another example of an execution engine is a Direct Memory Access (DMA) engine, which may be located outside the accelerator 102.

Input data 150 can arrive over the communication fabric 120. The communication fabric 120 can connect the accelerator 102 to other components of a processor, such as a DMA engine that can obtain input data 150 from an Input/Output (I/O) device, a storage drive, or a network interface. The input data 150 can be, for example one-dimensional data, such as a character string or numerical sequence, or two-dimensional data, such as an array of pixel values for an image or frequency and amplitude values over time for an audio signal. In some examples, the input data 150 can be three-dimensional, as may be the case with, for example, the situational information used by a self-driving car or virtual reality data. In some implementations, the memory subsystem 104 can include a separate buffer for the input data 150. In some implementations, the input data 150 can be stored in the memory banks 114 when the accelerator 102 receives the input data 150.

In some examples, the accelerator 102 can implement a neural network processing engine. In these examples, the accelerator 102, for a set of input data 150, can execute a neural network to perform a task for which the neural network was trained. Executing a neural network on a set of input data can be referred to as inference or performing inference.

The weights for the neural network can be stored in the memory subsystem 104, along with input data 150 on which the neural network will operate. The neural network can also include instructions, which can program the processing engine array 110 to perform various computations on the weights and the input data. The instructions can also be stored in the memory subsystem 104, in the memory banks 114 or in a separate instruction buffer. The processing engine array 110 can output intermediate results, which represent the outputs of individual layers of the neural network. In some cases, the activation engine 116 and/or pooling engine 118 may be enabled for computations called for by certain layers of the neural network. The accelerator 102 can store the intermediate results in the memory subsystem 104 for inputting into the processing engine array 110 to compute results for the next layer of the neural network. The processing engine array 110 can further output final results from a last layer of the neural network. The final results can be stored in the memory subsystem 104 and then be copied out to host processor memory or to another location.

Figure 2:
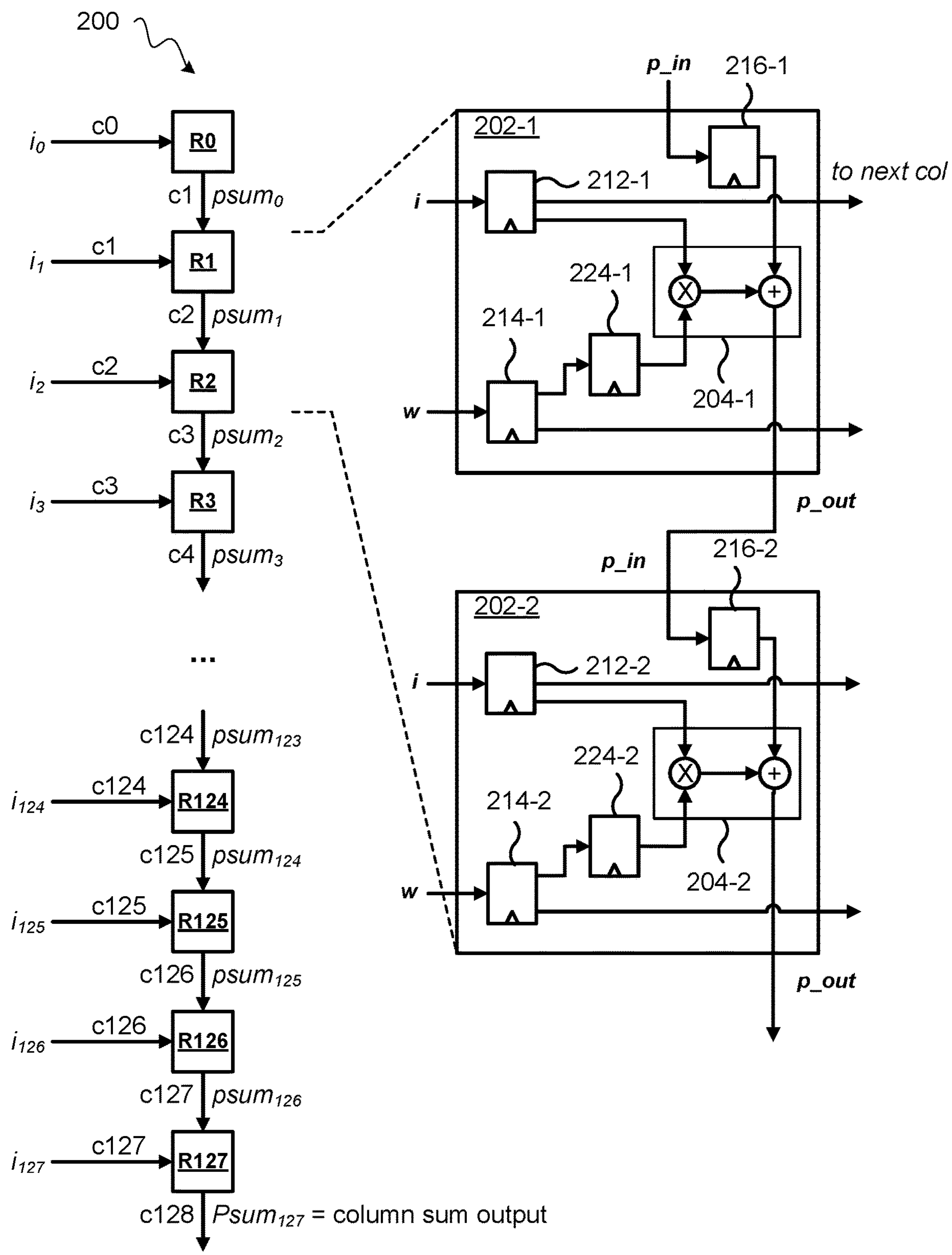
FIG. 2 illustrates a block diagram of an example of a column of a computational array.

FIG. 2 illustrates a block diagram of an example of a column 200 of a computational array (e.g., processing engine array 110). In the illustrated example, column 200 includes 128 processing engines coupled in the vertical direction of FIG. 2 to compute a column sum output, though other number of processing engines can be used. For illustration purposes, each processing engine of column 200 is designated by a row number. Hence, the processing engine at the top of column 200 is designated as R0, the next processing engine below the top processing engine is designated as R1, and the last processing engine of column 200 is designated as R127. Column 200 can be replicated in the horizontal direction of FIG. 2 to form a computational array. The internal circuitry of two adjacent processing engines is shown as processing engines 202-1 and 202-2. Each of the processing engines R0 to R127 has the same or similar internal circuitry.

Referring to processing engine 202-1, each of the processing engines of column 200 may include circuitry such as a feature map input buffer 212-1, a weight input buffer 214-1, and a partial sum input buffer 216-1. Collectively, feature map input buffer 212-1, weight input buffer 214-1, and partial sum input buffer 216-1 can be referred to as the input buffer of processing engine 202-1. Processing engine 202-1 may also include a weight register 224-1 and computational logic circuitry 204-1. Computation logic 204-1 may include multiply-and-accumulate logic such as a multiplier circuit coupled to an adder (summation) circuit.

During operation, the weight value w can be preloaded into processing engine 202-1 and stored in weight register 224-1. This is done because neural network computations typically perform repeated computations on the same set of weight values with different feature map input values. Thus, weight register 224-1 can eliminate the need to repeatedly reload the same weight value into the array. When a feature map input value i is shifted into processing engine 202-1, the computational logic 204-1 performs a multiply-and-accumulate operation on the feature map input value using the multiply-and-accumulate logic. For example, the multiply-and-accumulate operation may include multiplying the feature map input value i with the stored weight value w to generate a multiplication result, and adding the multiplication result to a partial sum input p_in to generate a partial sum output p_out. Once the partial sum output p_out is computed by processing engine 202-1, the partial sum output p_out is provided to the next processing engine 202-2 in column 200 as the partial sum input p_in of processing engine 202-2. The feature map input value of processing engine 202-1 is also shifted out to the next column of the array.

In order for processing engine 202-2 to perform its own multiply-and-accumulate operation for the column sum output of column 200, processing engine 202-2 has to first wait for the partial sum computed by processing engine 202-1. As such, the feature map input value for processing engine 202-2 used in the computation of the same column sum output is not shifted into processing engine 202-2 at the same time as processing engine 202-1. Instead, the feature map input value for processing engine 202-2 is shifted into processing engine 202-2 one clock cycle after processing engine 202-1. This allows arrival of the feature map input value of processing engine 202-2 to be aligned with the availability of the partial sum output from processing engine 202-1. This process is repeated for each processing engine of column 200 such that the feature map inputs for a particular column sum output are shifted into column 200 in a staggered manner.

To illustrate the staggered loading of feature map input values, column 200 has been annotated with the clock cycle number in which the inputs are provided to the processing engines R0-R127. For example, at the first clock cycle c0, the feature map input value $i_0$ is shifted into processing engine R0; at the second clock cycle c1, the feature map input value $i_1$ is shifted into processing engine R1, and the partial sum output $psum_0$ computed by processing engine R0 is provided to processing engine R1; at the third clock cycle c2, the feature map input value $i_2$ is shifted into processing engine R2, and the partial sum output $psum_1$ computed by processing engine R1 is provided to processing engine R2; and so on, until clock cycle c128 when the last processing engine R127 completes the column sum computation and outputs the column sum output.

Figure 3:
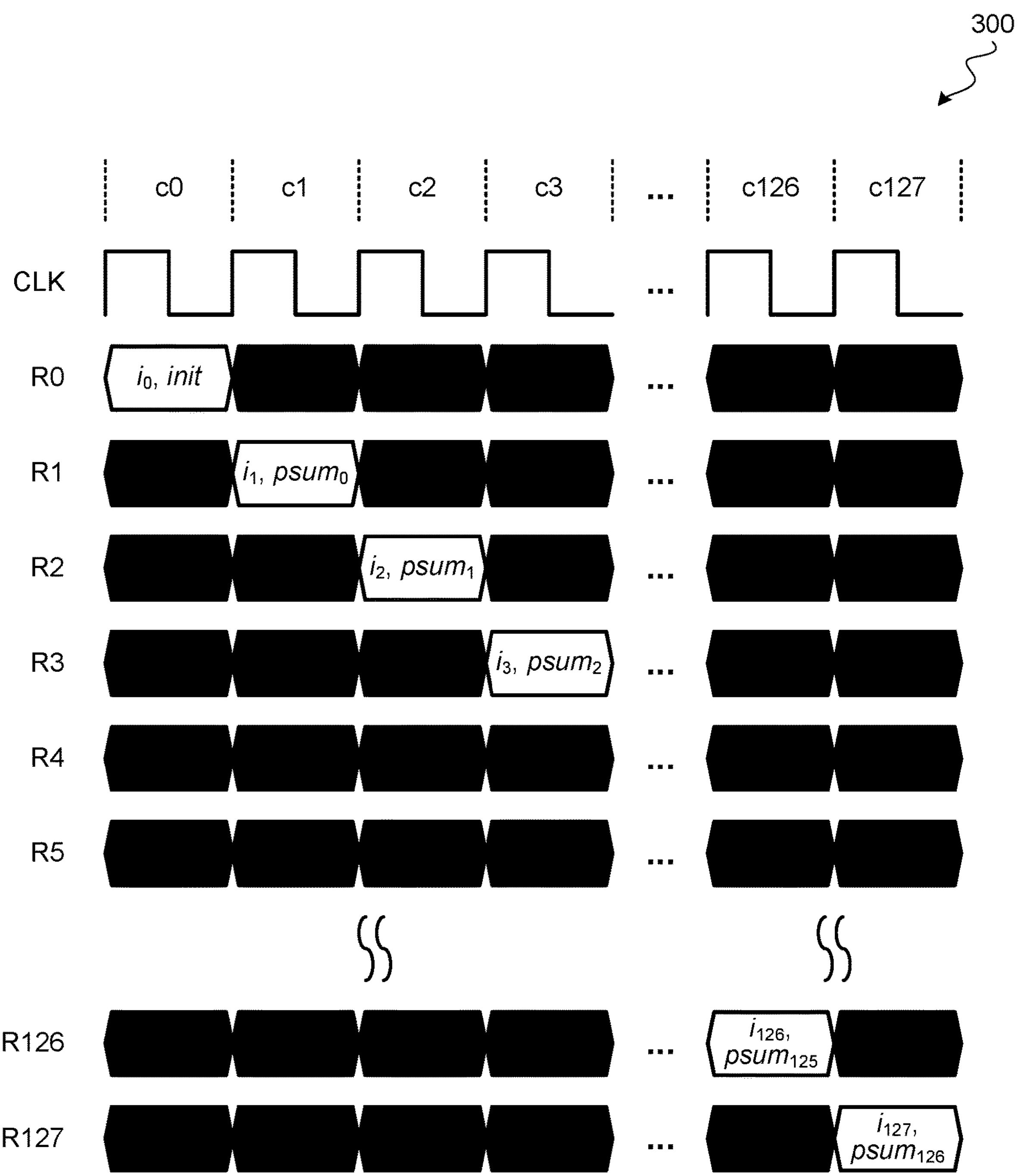
FIG. 3 illustrates a timing diagram of an example a column of a computational array.

FIG. 3 illustrates an example of a waveform 300 showing the timing of the operation of a column of a processing engine array (e.g., column 200). CLK represents the clock signal driving the array, and the input signals representing the feature map input value and partial sum input for each processing engine are designated by the row number of the processing engine. Thus, similar to the description above, at the first clock cycle c0, the feature map input value $i_0$ and an initial partial sum value init (e.g., zero) are shifted into processing engine R0; at the second clock cycle c1, the feature map input value $i_1$ is shifted into processing engine R1, and the partial sum output $psum_0$ computed by processing engine R0 is provided to processing engine R1; at the third clock cycle c2, the feature map input value $i_2$ is shifted into processing engine R2, and the partial sum output $psum_1$ computed by processing engine R1 is provided to processing engine R2; and so on. At clock cycle c127, the feature map input value $i_{127}$ is shifted into processing engine R127, and the partial sum output $psum_{126}$ computed by processing engine R126 is provided to processing engine R127. The column sum computed from the set of feature map values $i_0$ to $i_{127}$ will be available at the next clock cycle c128 (not shown). Thus, the latency of computing a column sum output on a set of feature map values using such a computational array can be generalized as requiring one clock cycle per row, which in the illustrated example will be 128 clock cycles because the column contains 128 rows of processing engines.

It should also be noted that the processing engine array operates in a pipelined manner such that a new feature map input value is loaded into each processing engine at every clock cycle. Thus, taking processing engine R0 as an example, although the input signals at clock cycle c1 is grayed out in FIG. 3, processing engine R0 is actually receiving a second feature map input value during clock c1, which is used to compute a second column sum output. Similarly, during clock cycle c2, processing engine R0 receives a third feature map input value, which is used to compute a third column sum output, and so on. In this manner, after the initial latency, each column of the array can produce a column sum output computed from a different set of feature map input values at every clock cycle.

Given this operating principle, the performance of the processing engine array is directly proportional to the clock frequency of the array. Referring back to FIG. 2, the longest propagation delay of the data path from one processing engine to the next processing engine in the column is the computational logic 204-1 of the processing engine (e.g., the multiply-and accumulate logic). Put another way, in order for the array to operate properly, the multiple-and-accumulate operation of a processing engine has to be completed within one clock cycle. Thus, the clock frequency of the array may only be increased up to the point at which the clock period is still able to accommodate the propagation delay of the computational logic. Increasing the clock frequency of the array beyond this point without making architectural changes to the array may cause erroneous partial sums to be outputted by the processing engines.

Figure 4:
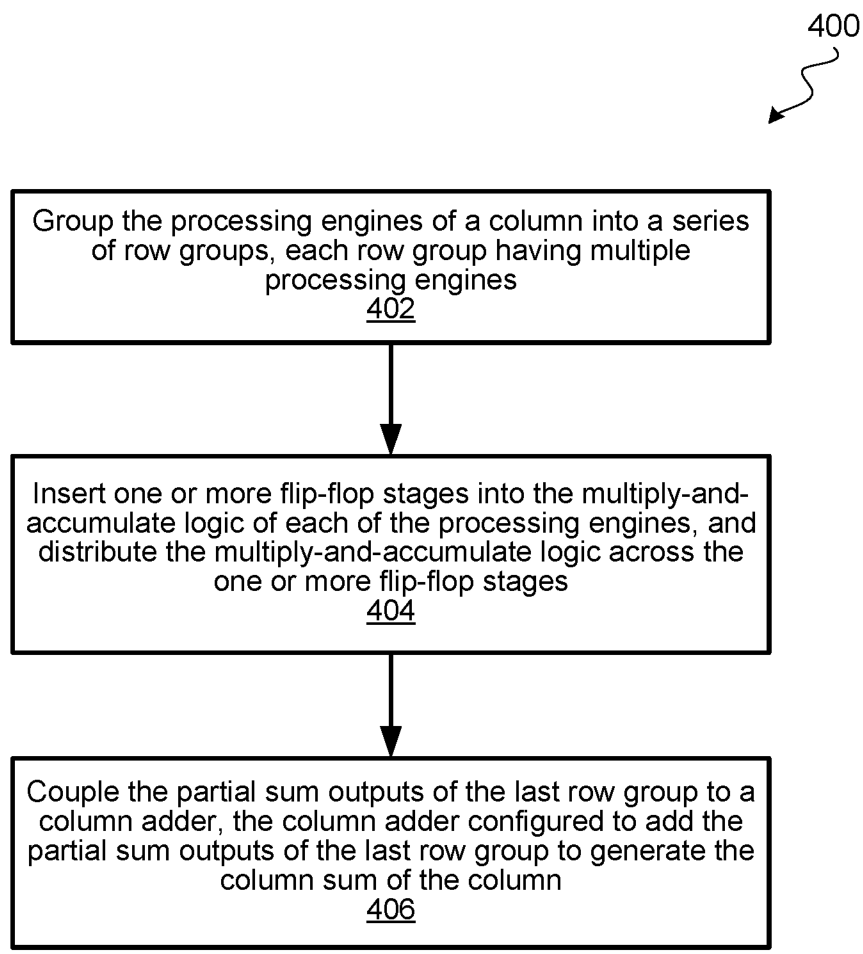
FIG. 4 illustrates a flow diagram of an example of a process for implementing a computational array.

FIG. 4 illustrates a flow diagram of an example of a process 400 for implementing a computational array (e.g., processing engine array such as a systolic array) with architectural modifications to allow the clock frequency to be increased, which in turn increases the throughput (TFLOPS) of the array. As described above, a computational array such as array 110 contains multiple columns that are each configured to generate a column sum. The architectural modifications described below can be implemented in each of the columns of the array.

At block 402, the processing engines of a column can be grouped into a series of row groups. Each row group can have multiple processing engines, and each row group may have the same number of processing engines. Each processing engine of a row group contains computational logic circuitry such as multiply-and-accumulate logic implemented as a multiplier circuit coupled to an adder circuit. The processing engines of a row group are each configured to operate in parallel with the other processing engines of that row group to perform computations for a column sum output.

For example, the processing engines of a row group may receive respective feature map input values for the column sum in parallel (during the same clock cycle), and perform a multiply-and-accumulate operation using their respective multiply-and-accumulate logic. The multiply-and-accumulate operation may include multiplying the feature map input value with a weight value to generate a multiplication result and adding the multiplication result to a partial sum input to generate a partial sum output for the next row group. Thus, in contrast to column 200 where each processing engine in a column receives the feature map input value for a column sum in a staggered manner, the processing engines that are part of the same row group receive their feature map input values during the same clock cycle.

At block 404, one or more flip-flop stages can be inserted into the multiply-and-accumulate logic of each of the processing engines, and the multiply-and-accumulate logic can be distributed across the one or more flip-flop stages. For example, a flip-flop stage can be inserted between the multiplier circuit and the addition circuit such that the output of the multiplier circuit is provided as the input to the inserted flip-flop stage, and the output of the inserted flip-flop stage is provided as the input to the addition circuit. In some implementations, the computational logic can be distributed in a different manner to balance the propagation delay between flip-flop stages of the processing engine. By way of example, a flip-flop stage can be inserted in the adder circuit of the multiply-and-accumulate logic, and the addition logic can be distributed to have part of the addition logic to be before the inserted flip-flop stage and part of the addition logic to be after the inserted flip-flop stage to balance the propagation delay between the flip-flop stages.

It should be noted that the number of flip-flops used to implement a particular flip-flop stage may vary depending on where along the datapath the flip-flop stage is being inserted. For example, in some implementations, the feature map input value and the weight value can each be a 22-bit floating-point number, and the partial sum can be a 34-bit floating-point number. Depending on where the flip-flop stage is being inserted or how the logic is being distributed before and after the flip-flop stage, the flip-flop stage may include 22 to 34 flip-flops.

In some implementations, multiple flip-flop stages can be inserted into the datapath of the computational logic. For example, two flip-flop stages can be inserted into the datapath of the multiply-and-accumulate logic such that the multiply-and-accumulate operation of a processing engine is performed over three clock cycles. In other implementations, additional flip-flop stages can be inserted to spread the multiply-and-accumulate operation over more than three clock cycles. The insertion of the flip-flop stages and/or the distribution of the multiply-and-accumulate logic can be performed, for example, by a synthesis tool. In some instances, the number of clock cycles allocated for the multiply-and-accumulate operation can be specified in the design of the processing engine circuitry, and the synthesis tool can insert the flip-flop stages, and distribute the logic in an optimal manner to balance the propagation delay between the flip-flop stages. In some instances, the flip-flop stages can be inserted prior to synthesis, and the synthesis tool can redistribute the logic to balance the propagation delay.

By inserting the flip-flop stages into the computational logic of the processing engine, the clock frequency of the array is no longer limited by the full propagation delay of the computational logic. For example, suppose the propagation delay of the computational logic is 2.5 ns. Without the additional flip-flop stages, the clock frequency of the array may be limited to 400 MHz with a clock period of 2.5 ns to accommodate the full propagation delay of 2.5 ns. By inserting a flip-flop stage and balancing the propagation delay of the computational logic to be 1.25 ns before the flip-flop stage and 1.25 ns after the flip-flop stage, then the clock frequency can be increased to 800 MHz with a clock period of 1.25 ns to accommodate the maximum propagation delay between flip-flop stages. More generally, the systolic array can be clocked with a clock signal having a clock period being equal to or greater than the maximum propagation delay between flip-flop stages of the multiply-and-accumulate logic. Increasing the number of flip-flop stages can reduce the maximum propagation delay between flip-flop stages, and hence allow for greater frequency increases. However, the additional flip-flop stages may add additional area and increase power consumption, so these factors can be balanced to determine the optimal number of flip-flop stage(s) to insert.

At block 406, because the processing engines of the column have been grouped into row groups for parallel execution, the partial sum outputs of the processing engines of the last row group of the column are coupled to a column adder. The column adder is configured to add the partial sum outputs of the last row group to generate the column sum output of the column. Accordingly, the architecture of a computational array can be modified to increase the clock frequency and TFLOPS of the array by inserting flip-flop stage(s) into the computation logic of the processing engine, forming row groups to parallelize the execution of the processing engines of a column, and providing a column adder to compute the sum of the outputs of the last row group.

Figure 5:
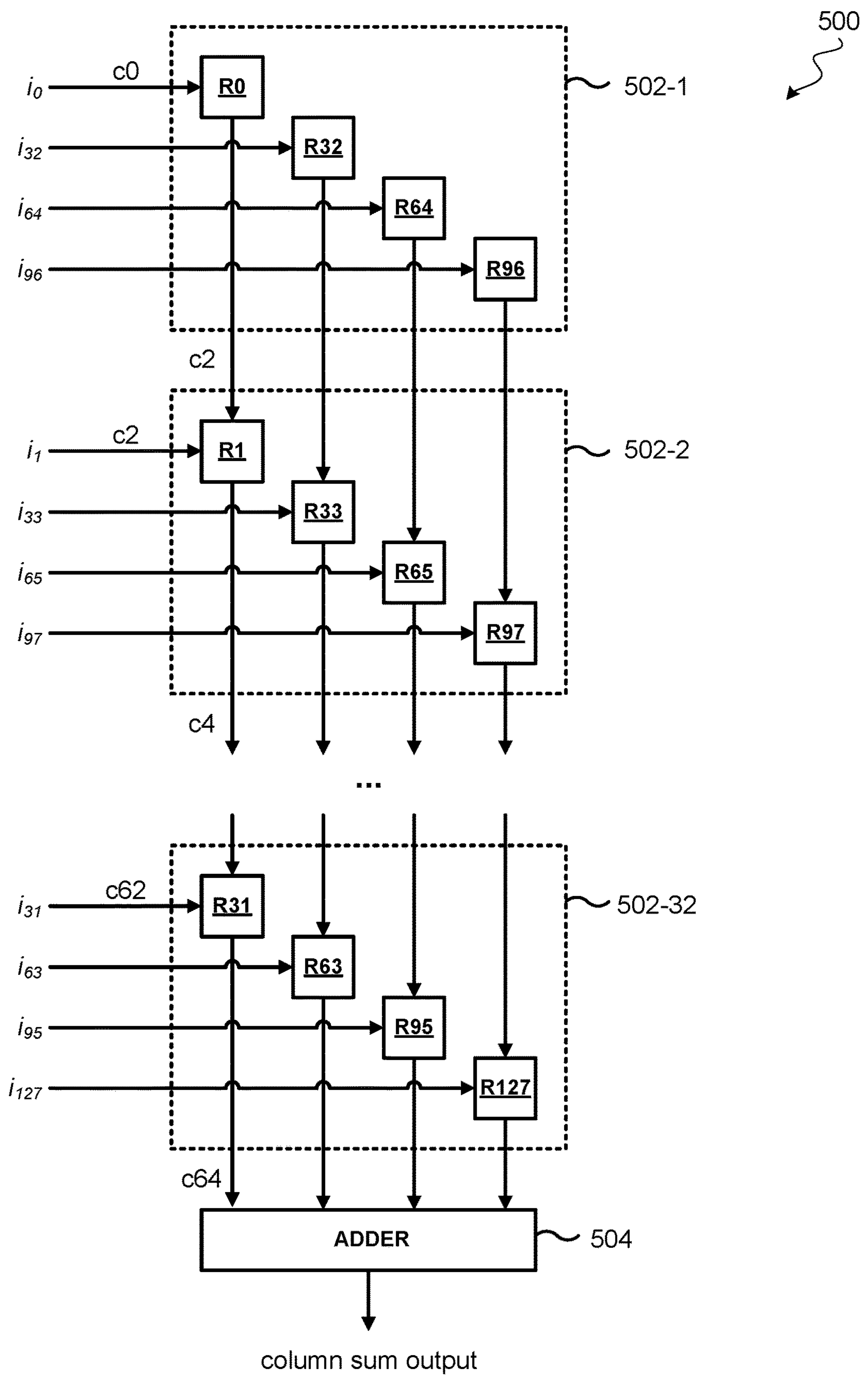
FIG. 5 illustrates a block diagram of another example of a column of a computational array.

FIG. 5 illustrates a block diagram of an example of a column 500 of a computational array (e.g., a systolic array) that can operate with a faster clock frequency. Column 500 can be implemented, for example, using the technique of process 400, and column 500 can be replicated in the horizontal direction of FIG. 5 to form the computational array. To form the computational array, processing engine R0 of column 500 is coupled to processing engine R0 of the next column such that the row input of processing engine R0 of column 500 is shifted along the processing engines belonging to row R0, processing engine R32 of column 500 is coupled to processing engine R32 of the next column such that the row input of processing engine R32 of column 500 is shifted along the processing engines belonging to row R32, and so on.

In the illustrated example, column 500 includes 128 processing engines to compute a column sum output, though a different number of processing engines can be used. The processing engines of column 500 has been grouped into multiple row groups 502-1 to 502-32 to parallelize their execution. In this particular example, each of the row groups 502-1 to 502-32 includes four processing engines: row group 502-1 includes processing engines R0, R32, R64, and R96; row group 502-2 includes processing engines R1, R33, R65, and R97; and so on. In other implementations, a different number of processing engines can be grouped together to form a row group. The partial sum outputs of the processing engines of a row group are provided as partial sum inputs to corresponding processing engines of the next row group. Hence, the partial sum outputs of processing engines R0, R32, R64, and R96 are provided as the partial sum inputs of processing engines R1, R33, R65, and R97, respectively, and so on. Due to the formation of the row groups, the last row group 502-32 of column 500 will output multiple partial sum outputs that should be summed together. As such, the partial sum outputs of the last row group 502-32 are coupled to a column adder 504, and column adder 504 adds the partial sum outputs together to generate the column sum output of column 500.

Figure 6B:
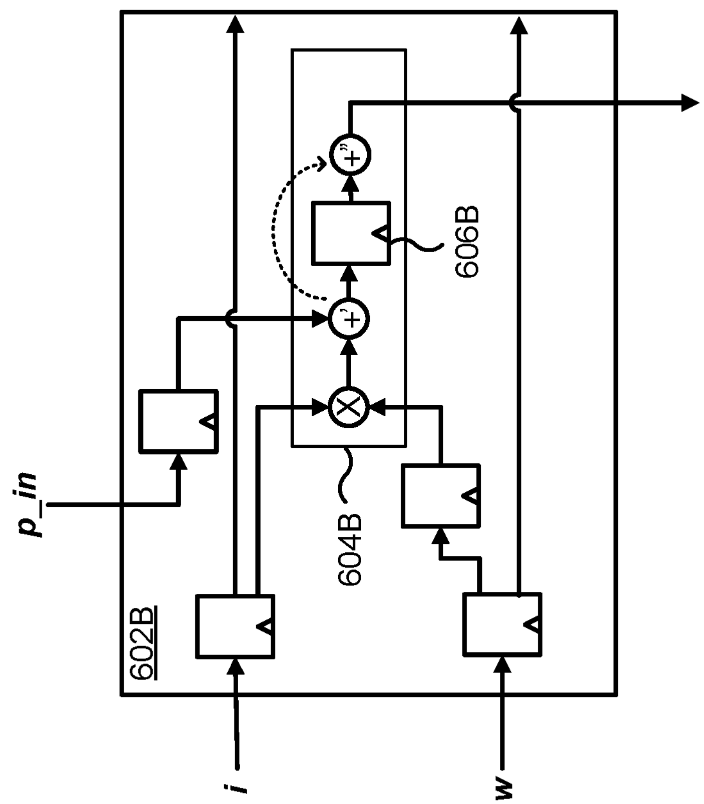
FIGS. 6A-6B illustrate an example of a processing engine being modified.
Figure 6A:
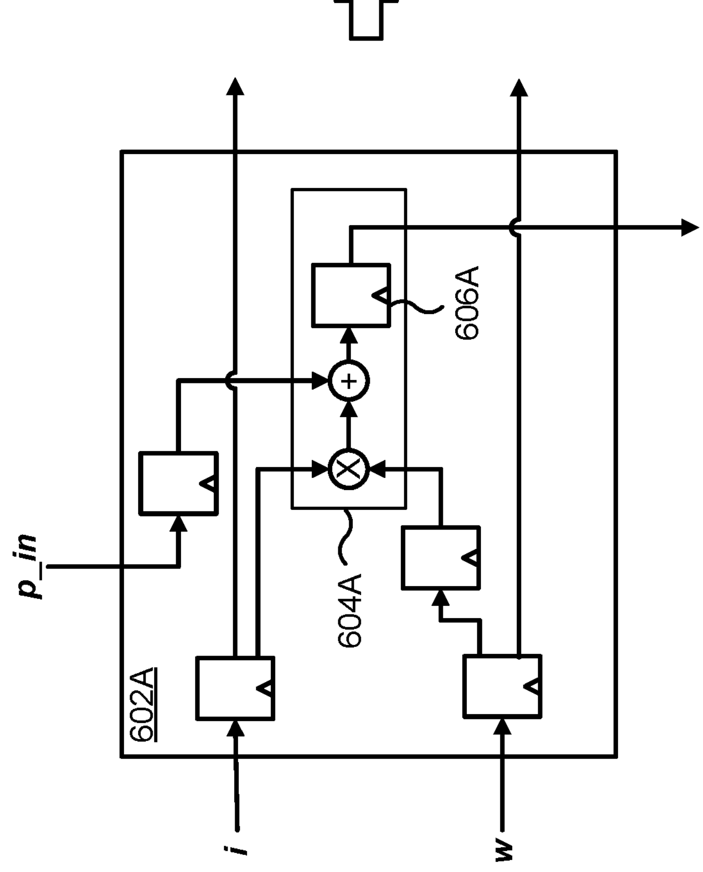

FIGS. 6A-6B illustrate an example of the modifications made to a processing engine that allow a computational array to operate at a faster clock frequency. The modifications can be made, for example, to the processing engines of column 500. Referring to FIG. 6A, processing engine 602A includes a flip-flop stage 606A inserted in the multiply-and-accumulate computational logic 604A. In this example, flip-flop stage 606A is added along the column computational path, and in particular, to the addition logic. The addition logic may have the longest propagation delay in processing engine 602A because the addition operation is being performed on large floating-point numbers (e.g., 34-bit floating-point numbers). Thus, it can be beneficial to insert a flip-flop stage along the addition logic to distribute the long propagation delay of this logic across multiple clock cycles. In the example shown in FIG. 6A, flip-flop stage 606A is initially inserted after the adder circuit. This can be done, for example, in the RTL (register-transfer level) model of the computational logic block.

Next, referring to FIG. 6B, a synthesis tool processing the RTL model of processing engine 606A can retime the circuitry and distribute part of the addition logic to be after the inserted flip-flop stage to generate processing engine 606B. As shown by the dotted arrow in FIG. 6B, part of the adder circuit can be moved to follow flip-flop stage 606B.

Collectively, the logic denoted as +' and +" contain the circuitry to perform the addition operation of the computational logic 604B. By distributing the addition logic across flip-flop stage 606B, the clock frequency can be increased to have a clock period being at least the greater of the propagation delay of the +' logic and the +" logic. For example, if the addition logic takes 2.5 ns, this logic can be distributed such that the +' logic has a propagation delay of 1.5 ns between the p_in input buffer and flip-flop stage 606B, and the +" logic has a propagation delay of 1.0 ns. Under this example, the clock frequency can be increased from 400 Mhz (clock period of 2.5 ns) to 666.67 Mhz (clock period of 1.5 ns) to accommodate the maximum propagation delay of 1.5 ns between flip-flop stages. In some implementations, a synthesis tool can distribute the logic in a manner such that the propagation delay of the +' logic is balanced with the propagation delay of the +" logic (each being 1.25 ns). Under such a scenario, the clock frequency can be doubled to 800 MHZ, because the maximum propagation delay between flip-flop stages is now 1.25 ns.

Figure 7:
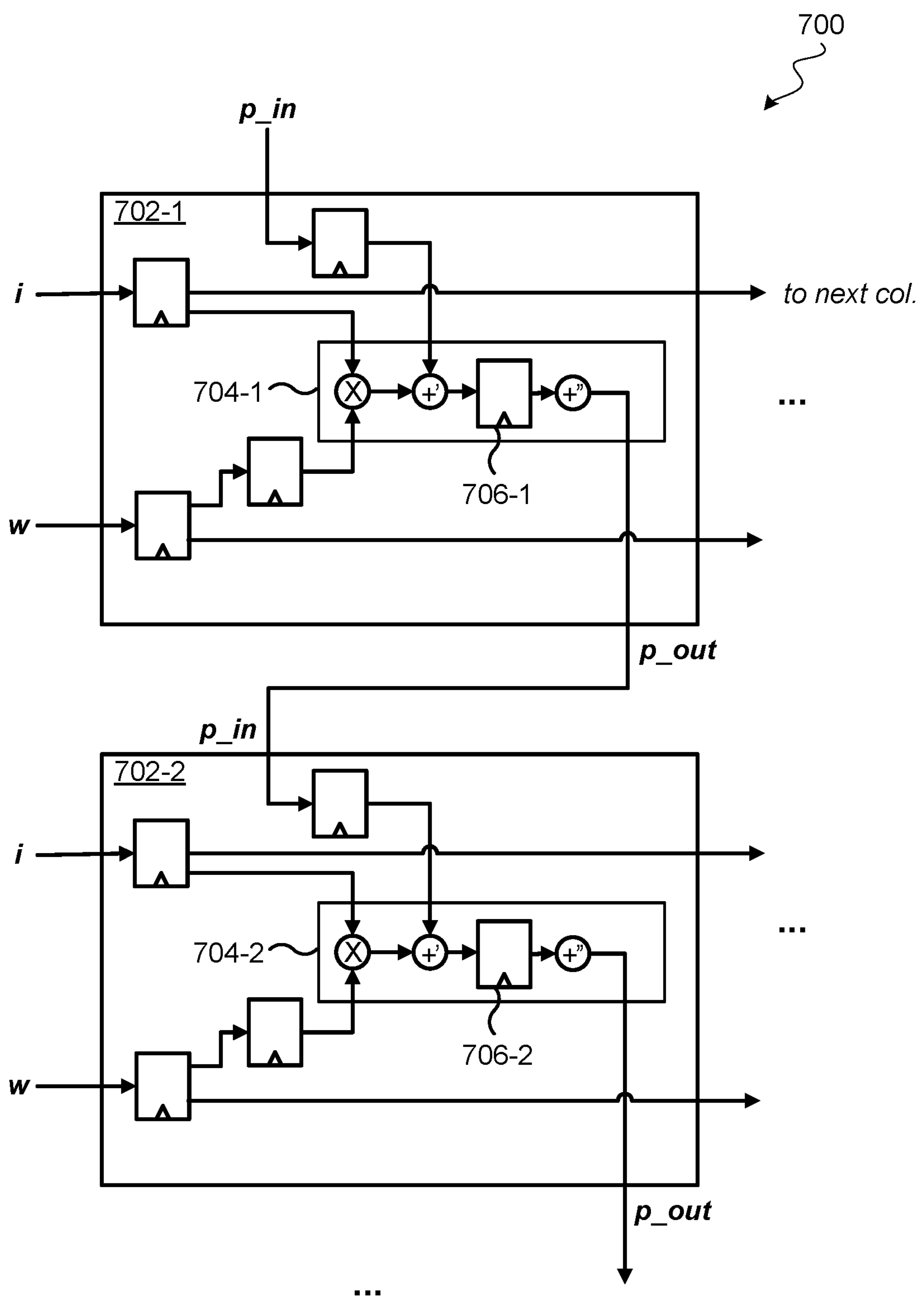
FIG. 7 illustrates a block diagram of an example of processing engines in a column.

FIG. 7 illustrates a block diagram 700 of an example of the internal circuitry of two adjacent processing engines along column 500. The two adjacent processing engines are shown as processing engines 702-1 and 702-2. For example, processing engine 702-1 can be processing engine R0 of FIG. 5, and processing engine 702-2 can be processing engine R1 of FIG. 5. Each of the processing engines R0 to R127 of column 500 has the same or similar internal circuitry, and includes the modifications of FIGS. 6A-6B. Referring to processing engine 702-1, the computational logic circuitry 704-1 that implements the multiply-and-accumulate logic has a flip-flop stage 706-1 inserted in addition logic of the adder circuit. The other components are similar to those of processing engine 202-1, and thus a detailed description of which need not be repeated.

During operation, when a feature map input value i is shifted into processing engine 702-1, the computational logic 704-1 performs a multiply operation by multiplying the feature map input value i with the stored weight value w to generate a multiplication result. The multiplication result is then added to a partial sum input p_in to generate a partial sum output p_out over two clock cycles. Once the partial sum output p_out is computed by processing engine 702-1, the partial sum output p_out is provided to the next processing engine 702-2 in the column as the partial sum input p_in of processing engine 702-2. Thus, in contrast to processing engine 202-1 which takes one clock cycle to output the partial sum, processing engine 702-1 takes two clock cycles to output the partial sum because of the insertion of flip-flop stage 706-1.

In order for processing engine 702-2 to perform its own multiply-and-accumulate operation for the column sum output of column 700, processing engine 702-2 has to first wait for the partial sum computed by processing engine 702-1. As such, the feature map input value for processing engine 702-2 used in the computation of the same column sum output is not shifted into processing engine 702-2 until two clock cycles after the feature map input value is shifted into processing engine 702-1. This allows arrival of the feature map input value of processing engine 702-2 to be aligned with the availability of the partial sum output from processing engine 702-1. This process is repeated for the processing engines of column 500 that are coupled vertically such that the feature map inputs for a particular column sum output are shifted into the processing engines of different row groups in a staggered fashion. Processing engines of column 500 that are part of the same row group operate in parallel, and thus the feature map input values for processing engines of the same row group can be shifted into the row group in the same clock cycle.

Referring back to FIG. 5, to illustrate the loading of feature map input values into column 500, FIG. 5 has been annotated with the clock cycle number in which the inputs are provided to the processing engines R0-R127. For example, at the first clock cycle c0, the feature map input values $i_0$, $i_{32}$, $i_{64}$, and $i_{96}$ are respectively shifted into processing engines R0, R32, R64, and R96 in parallel (during the same clock cycle). At the second clock cycle c1 (not shown), processing engines R0, R32, R64, and R96 have computed the multiplication part of the multiply-and-accumulate operation, and the multiplication results are registered in the internal flip-flop stage. The feature map input values for the next row group are not shifted in at this point, because the partial sum outputs of row group 502-1 are not yet available. Meanwhile, the feature map input values $i_0$, $i_{32}$, $i_{64}$, and $i_{96}$ can be shifted out from processing engines R0, R32, R64, and R96 of column 500 to the corresponding processing engines of the next column at the second clock cycle c1.

Next, at the third clock cycle c2, the feature map input values $i_1$, $i_{33}$, $i_{65}$, and $i_{97}$ are respectively shifted into processing engines R1, R33, R65, and R97 in parallel (during the same clock cycle), and the partial sum outputs computed by processing engines R0, R32, R64, and R96 are respectively provided to processing engines R1, R33, R65, and R97. This process is repeated until clock cycle c64 when processing engines R31, R63, R95, and R127 of the last row group 502-32 complete their partial sum computations, and output the partial sum outputs to column adder 504. Column adder 504 then computes the sum of the partial sum outputs of R31, R63, R95, and R127 to generate the column sum output of column 500.

Figure 8:
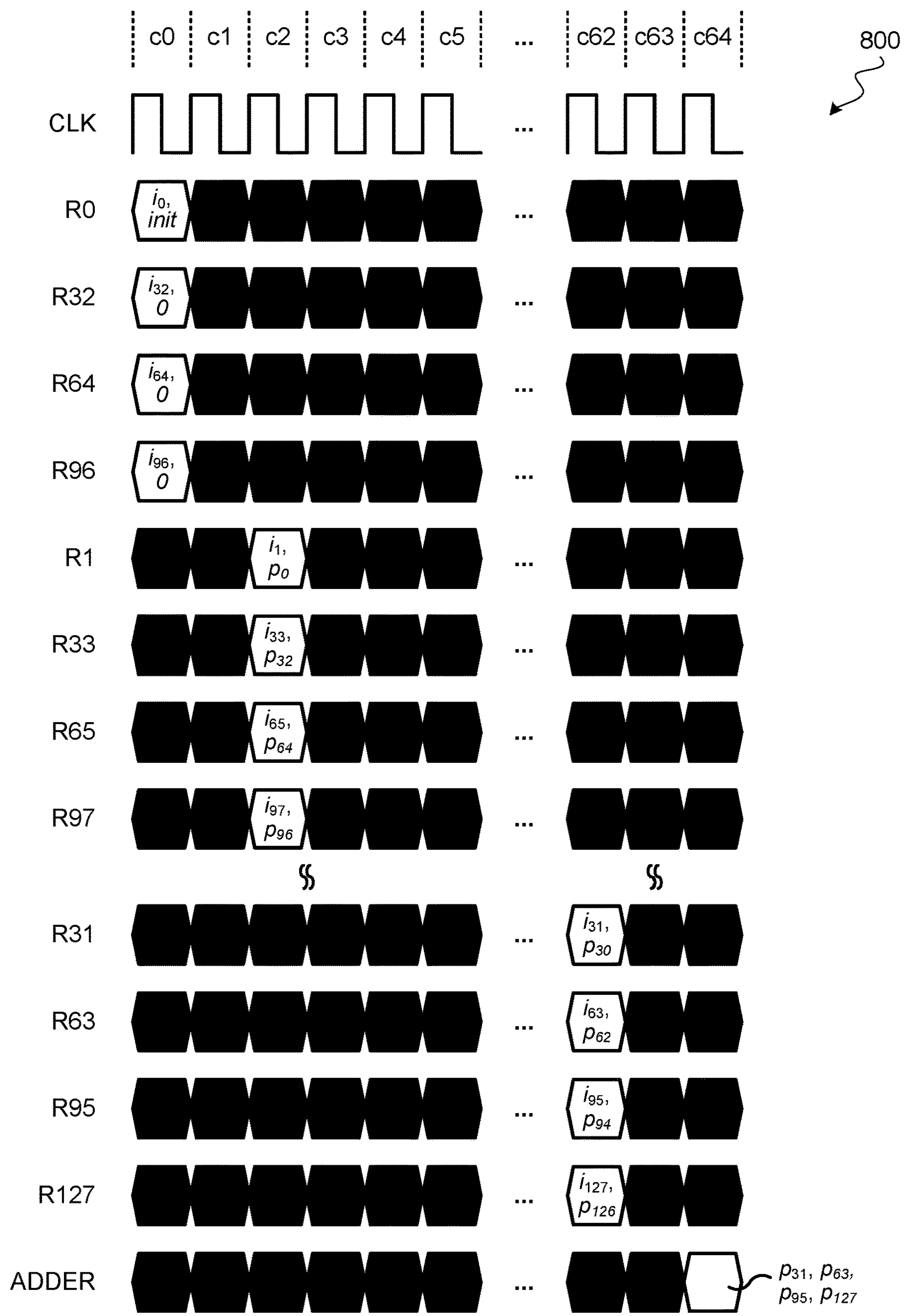
FIG. 8 illustrates a timing diagram of another example of a column of a computational array.

FIG. 8 illustrates an example of a waveform 800 showing the timing of the operation of column 500. CLK represents the clock signal driving the array, and the input signals representing the feature map input and partial sum input for each processing engine are designated by the row number of the processing engine. At the first clock cycle c0, the feature map input values $i_0$, $i_{32}$, $i_{64}$, and $i_{96}$ are respectively shifted into processing engines R0, R32, R64, and R96 that form the first row group 502-1 during the same clock cycle. An initial partial sum value init (e.g., zero) can be provided to one of the processing engines (e.g., processing engine R0), and the other processing engines of the first row group 502-1 can be provided with an initial partial sum of zero.

At the second clock cycle c1, the feature map input values $i_0$, $i_{32}$, $i_{64}$, and $i_{96}$ are respectively shifted from processing engines R0, R32, R64, and R96 to their corresponding processing engines in the next column. Although the remaining clock cycles of processing engines R0, R32, R64, and R96 are grayed out in waveform 800, these grayed out clock cycles actually represent feature map input values and partial sum input values for other column sum computations. Thus, at the second clock cycle c1, a new set of feature map input values for a different column sum are shifted into processing engines R0, R32, R64, and R96.

At the third clock cycle c2, the feature map input values $i_1$, $i_{33}$, $i_{65}$, and $i_{97}$ are respectively shifted into processing engines R1, R33, R65, and R97 of the second row group 502-2. The partial sum outputs $p_0$, $p_{32}$, $p_{64}$, and $p_{96}$ computed by the first row group 502-1 are also provided respectively to processing engines R1, R33, R65, and R97 of the second row group 502-2. This process repeats for each of the row groups. Then at clock cycle c62, the feature map input values $i_{31}$, $i_{63}$, $i_{95}$, and $i_{127}$ are respectively shifted into processing engines R31, R63, R95, and R127 that form the last row group 502-32. The partial sum outputs $p_{30}$, $p_{62}$, $p_{94}$, and $p_{126}$ computed by the previous row group are also provided respectively to processing engines R31, R63, R95, and R127. Two clock cycles later at clock cycle c64, processing engines R31, R63, R95, and R127 completes their partial sum computations and provide the partial sum outputs $p_{31}$, $p_{63}$, $p_{95}$, and $p_{127}$ to the column adder ADDER. The column adder then generates the column sum output by adding the partial sum outputs $p_{31}$, $p_{63}$, $p_{95}$, and $p_{127}$ from the last row group 502-2, and output the column sum in the next clock cycle. It should be noted that although waveform 800 shows the remaining clock cycles as begin grayed out, these grayed out clock cycles are actually carrying data in a pipelined fashion for other column sum computations. Hence, column 500 can output a column sum output computed from a set of feature map input values at every clock cycle.

For the purpose of illustrating the performance improvement, suppose the insertion of flip-flop stage 706-1 allows the clock frequency of column 500 to operate at twice the frequency of column 200. Under such a scenario, because column 500 can be clocked twice as fast as column 200, the throughput (TFLOPS) of column 500 can be 2× the throughput of column 200. The aforementioned modifications made to the computational array also allow the column sum to be computed in less clock cycles. By way of example, the column sum output in FIG. 3 is produced by column 200 in clock cycle c128, whereas the same column sum computation can be performed and outputted by column 500 in clock cycle c65. Thus, under the scenario in which column 500 is operating at twice the frequency of column 200, the latency of the column sum computation can be reduced by almost 4×. The performance of the computational array can be further improved by inserting additional flip-flop stages to further reduce the operating clock frequency.

Figure 9:
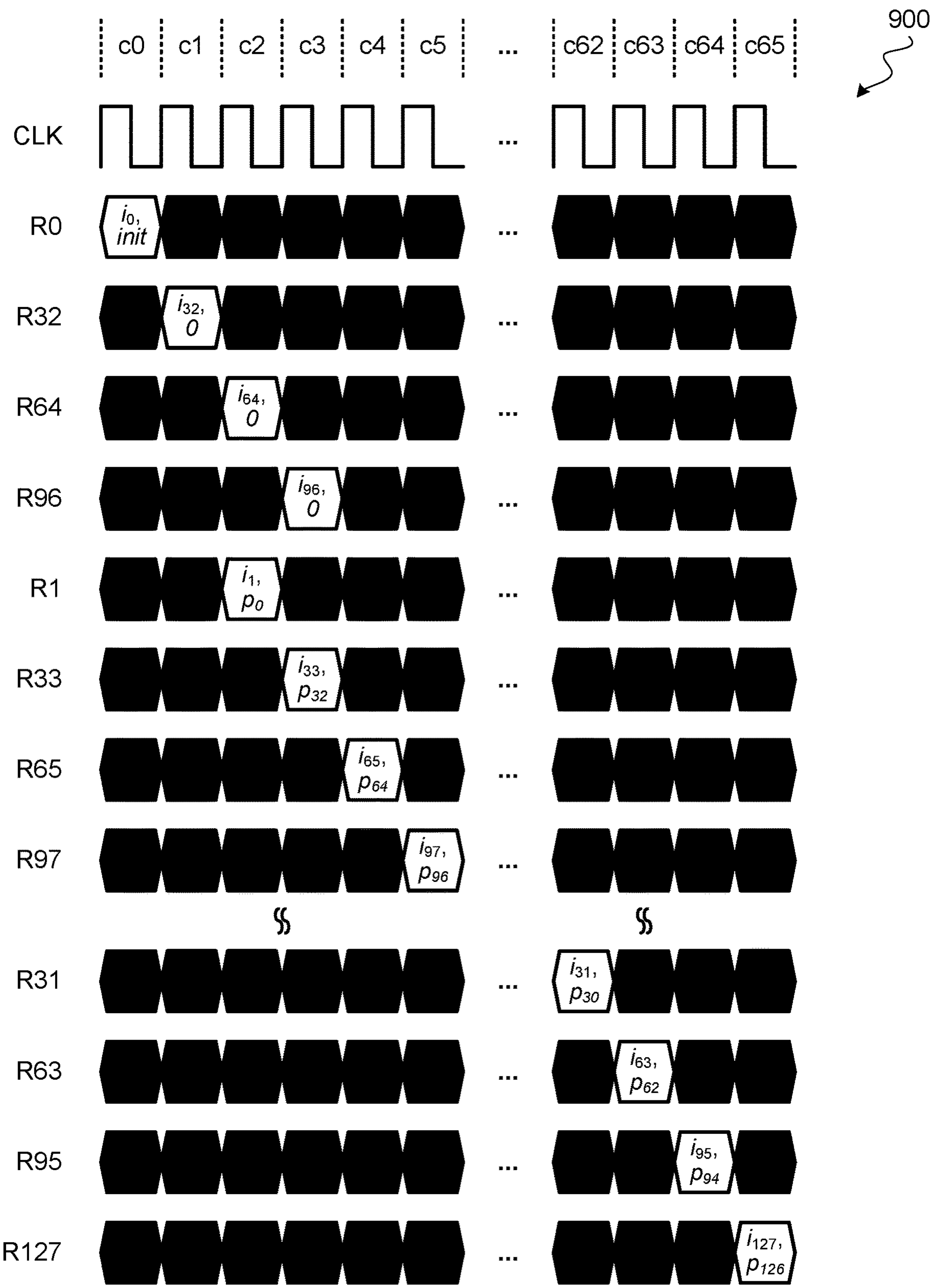
FIG. 9 illustrates another timing diagram of an example of a column of a computational array.

FIG. 9 illustrates an example of a waveform 900 showing an alternative timing of the operation of column 500. In contrast to waveform 800, the feature map input values of a row group are shifted into the processing engines of that row group in a staggered manner (in sequential clock cycles), while the feature map input values of corresponding processing engines of sequential row groups are separated by two clock cycles (which is the number of clock cycles for a processing engine to output a partial sum). For example, at the first clock cycle c0, the feature map input value $i_0$ is shifted into processing engine R0; at the second clock cycle c1, the feature map input value $i_{32}$ is shifted into processing engine R32; at the third clock cycle c2, the feature map input value $i_{64}$ is shifted into processing engine R64; and at the fourth clock cycle c3, the feature map input value $i_{96}$ is shifted into processing engines R96 that form the first row group 502-1.

Meanwhile, at the third clock cycle c2, the feature map input value $i_1$ is shifted into processing engine R1. The feature map input value $i_1$ is shifted into processing engine R1 at this clock cycle, because the partial sum output from processing engine R0 becomes available at this clock cycle. Similarly, at the fourth clock cycle c3, the feature map input value $i_{33}$ is shifted into processing engine R33 because the partial sum output from processing engine R32 becomes available at this clock cycle; at the fifth clock cycle c4, the feature map input value $i_{65}$ is shifted into processing engine R65 because the partial sum output from processing engine R64 becomes available at this clock cycle; and at the sixth clock cycle c5, the feature map input value $i_{97}$ is shifted into processing engine R97 forming the second row group 502-2 because the partial sum output from processing engine R96 becomes available at this clock cycle; and so on.

Referring to the last row group 502-32 that includes processing engines R31, R63, R95, and R127, although not shown in waveform 900, the processing engines of this last row group will output their respective partial sums to column adder ADDER in a staggered manner. For example, processing engine R31 will output its partial sum to the column adder ADDER at clock cycle c64; processing engine R63 will output its partial sum to the column adder ADDER at clock cycle c65; processing engine R95 will output its partial sum to the column adder ADDER at clock cycle c66; processing engine R127 will output its partial sum to the column adder ADDER at clock cycle c67. Because the column adder ADDER receives the partial sums from the last row group 502-32 in a staggered manner, additional flip-flop stages can be used to delay the partial sum from R31 by three clock cycles, the partial sum from R63 by two clock cycles, and the partial sum from R95 by one clock cycle to align the partial sums from this last group for summation to generate the column output. The performance improvement of operating column 500 as shown in FIG. 9 is similar to that of FIG. 8, because the increase in the operating clock frequency is the same as that of FIG. 8.

Figure 10:
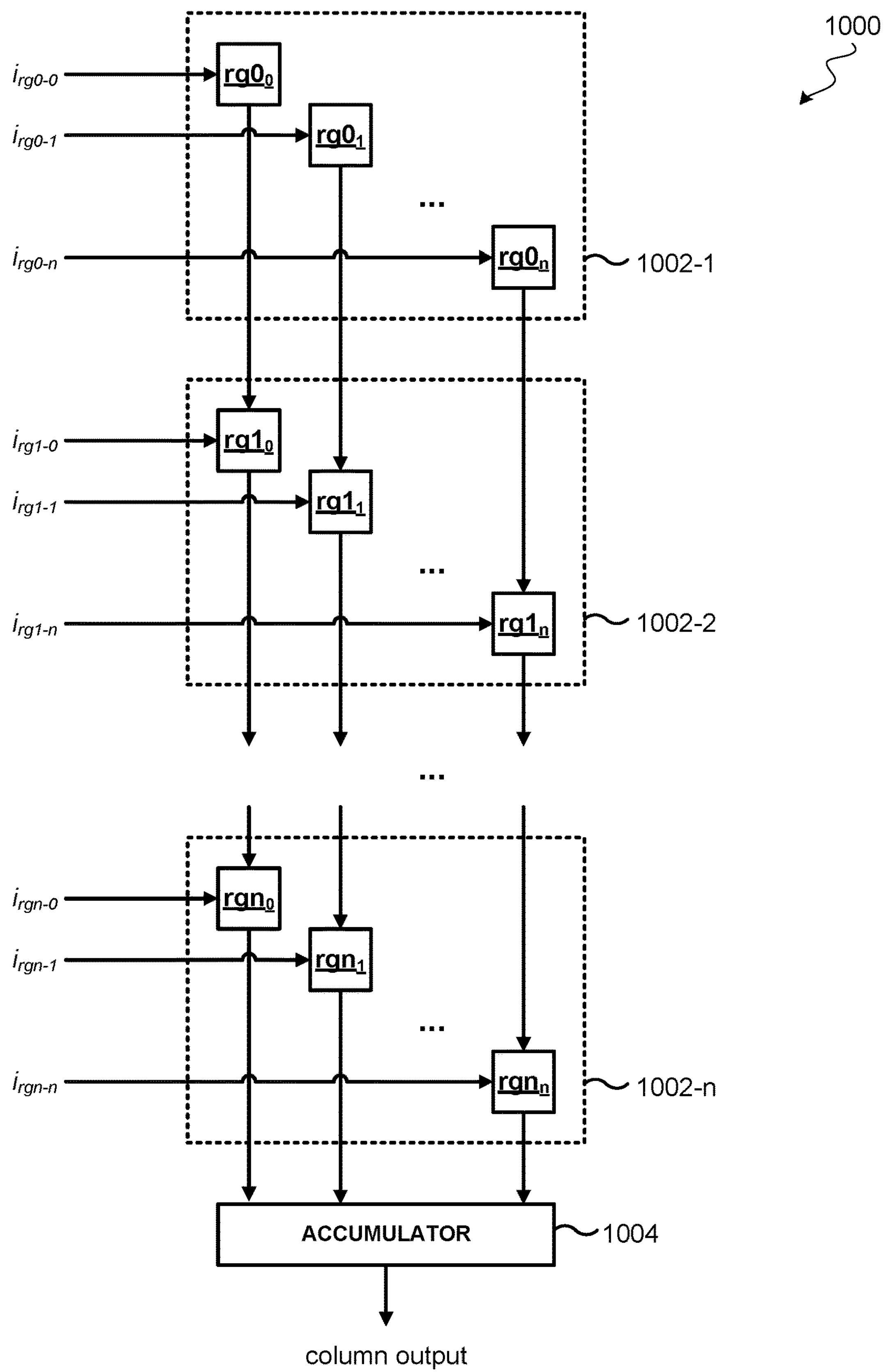
FIG. 10 illustrates a block diagram of a further example of a column of a computational array.

Although the techniques for performance improvement have thus far been described with reference to processing engines that perform multiply-and-accumulate operations, such techniques can also be applied to other types of computational hardware that perform other types of computations. FIG. 10 illustrates a block diagram of an example of a column 1000 of processing engines in an integrated circuit device that employs the performance improvement techniques described herein. Column 1000 can be replicated in the horizontal direction of FIG. 10 to form an array of processing engines with multiple columns in which each column is configured to generate a column output.

Column 1000 includes multiple row groups 1002-1 to 1002-*n*. Each of the row groups 1002-1 to 1002-*n* can include two or more processing engines. For example, row group 1002-1 may include processing engines $rg0_0$ to $rg0_n$; row group 1002-1 may include processing engines $rg1_0$ to $rg1_n$; and row group 1002-*n* may include processing engines $rgn_0$ to $rgn_n$. Although each of the row groups in FIG. 10 is shown to have the same number of processing engines, it's possible for the row groups to have a different number of processing engines. For example, if the column has a prime number of processing engines, one of the row groups can have fewer processing engines than the other row groups. In such scenarios, the omitted processing engine in that row group can be substituted with one or more flip-flop stage(s) to keep the computational pipeline in synchrony.

Each of the processing engines of a row group includes a computational circuit, and is configured to perform operations in parallel with the other processing engines of the row group. These operations can include receiving an input value for computing the column output, performing a computation on the input value over multiple clock cycles using the computational circuit to derive an intermediate value, and outputting the intermediate value from the processing engine to a corresponding processing engine in the next row group. The processing engines of a row group can also shift the received input values to the next column in parallel at the next clock cycle after receiving the input values.

Column 1000 also includes a column accumulator 1004. The intermediate values outputted from the last row group can be accumulated by a column accumulator 1004 to generate the column output of column 1000. Depending on the type of computations being performed by column 1000, column accumulator 1004 can be, for example, an adder circuit, a multiplier circuit, or other circuit that performs a logic function to combine the intermediate values.

Figure 11:
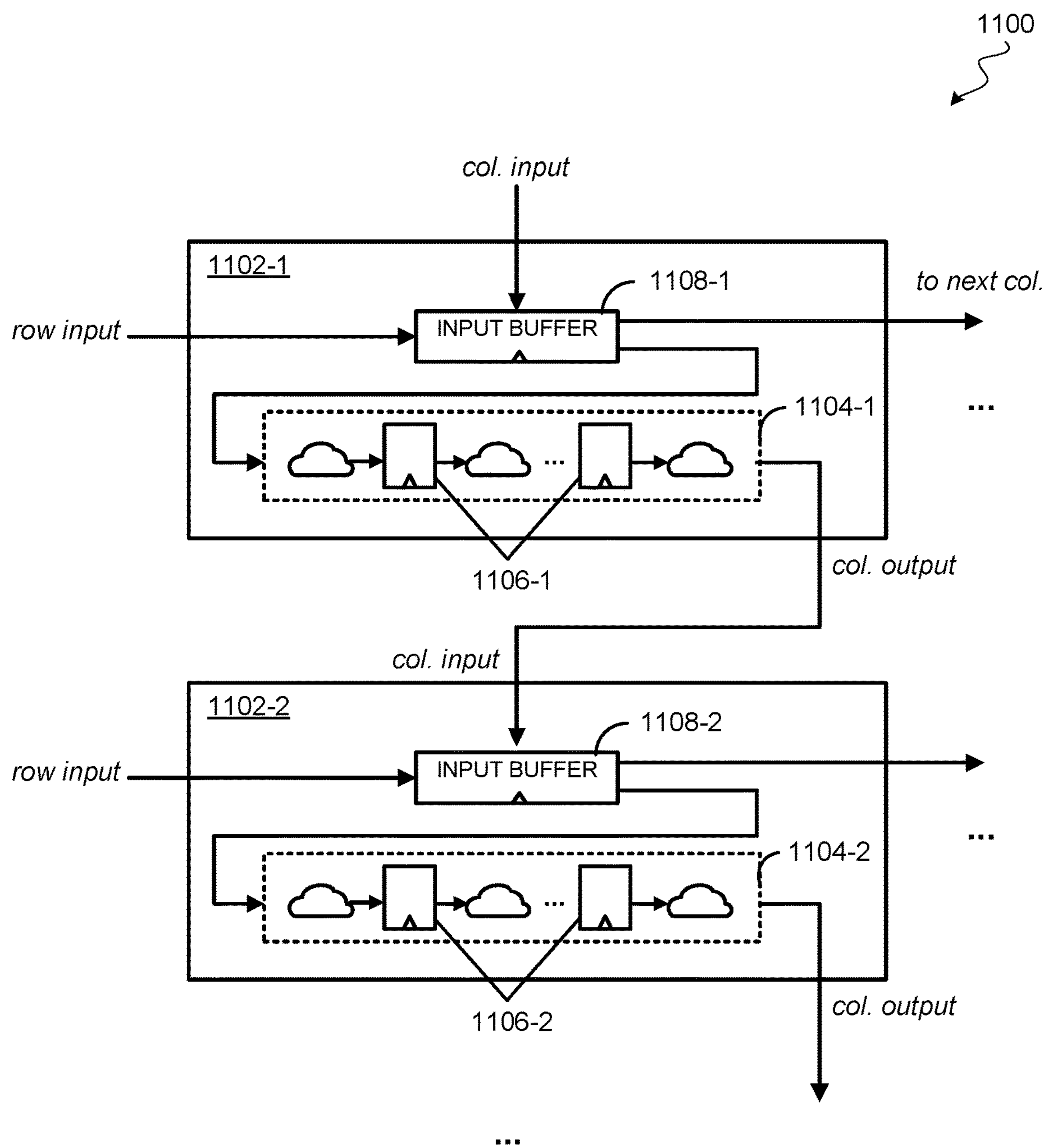
FIG. 11 illustrates a block diagram of another example of processing engines in a column.

FIG. 11 illustrates a block diagram of an example of the internal circuitry of two processing engines 1102-1 and 1102-2 coupled in a column (e.g., column 1000). Processing engine 1102-1 includes an input buffer 1108-1 and a computational circuit 1104-1. During operation, processing engine 1102-1 can receive a row input value and a column input value. The row input can represent one or more values. Similarly, the column input can represent one or more values. The row input and the column input are registered by input buffer 1108-1, which can be implemented using a set of flip-flops and serves as a flip-flop stage. The row input can be shifted out from processing engine 1102-1 to a corresponding processing engine in the next column after one clock cycle. In some implementations, processing engine 1102-1 can include storage registers to store input values that are reused during successive cycles such that these values need not be shifted in at every cycle.

Computational circuit 1104-1 includes logic to perform one or more computations on the row input and column input to generate a column output. The column output is considered as an intermediate value that is provided as the column input to the next processing engine 1102-2 in the column. By way of example, the row input may include an input value representing a feature map input value, and an input value representing a weight value. The column input may include a partial sum input. The computation being performed by processing engine 1102-2 can be a multiply-and-accumulate computation that multiplies the feature map input value with the weight value to derive a multiplication result, and adds the multiplication result to a partial sum input to generate the partial sum output as the intermediate value.

Computational circuit 1104-1 can include one or more flip-flop stage(s) 1106-1 inserted in the datapath, and the computation logic can be distributed across the multiple flip-flop stages. In FIG. 9, the distributed computation logic is represented as the clouds before and/or after the flip-flop stages. The number of the flip-flop stage(s) 1106-1 inserted into computation circuit 1104-1 will determine the number of clock cycles it takes for processing engine 1102-1 to output the intermediate value to processing engine 1102-2. Thus, if two flip-flop stage(s) 1106-1 are inserted, then processing engine 1102-1 will take three clock cycles from receiving the input value to performing the computation and outputting the intermediate value. Because of the additional clock cycles, the row input for processing engine 1102-2 is not shifted into processing engine 1102-2 until the intermediate value from processing engine 1102-1 is available. For example, inserting one flip-flop stage into computational circuit 1104-1 will add one additional clock cycle to the datapath, and the input values to successive processing engines of the next row group for computing the column output will be shifted in at every other clock cycle; inserting two flip-flop stages into computational circuit 1104-1 will add two additional clock cycles to the datapath, and the input values to successive processing engines of the next row group for computing the column output will be shifted in at every third clock cycle; inserting three flip-flop stages into computational circuit 1104-1 will add three additional clock cycles to the datapath, and the input values to successive processing engines of the next row group for computing the column output will be shifted in at every fourth clock cycle; and so on.

The insertion of the flip-flop stage(s) 1106-1 and distribution of the computational logic allows the operating clock frequency to be increased, because the clock signal may only need to have a clock period long enough to accommodate the maximum propagation delay between the flip-flop stages of the computational circuit 1104-1. Thus, the processing engine (and the column/array that the processing engine is part of) can be clocked with a clock signal have a clock period being equal to or greater than a maximum propagation delay between the flip-flop stages of the computation circuit 1104-1. Increasing the number of flip-flip stage(s) 1106-1 can incrementally reduce the propagation delay between flip-flop stages, and hence allows for incremental increase in the clock frequency. However, doing so may incur an increase in area and power consumption.

Figure 12:
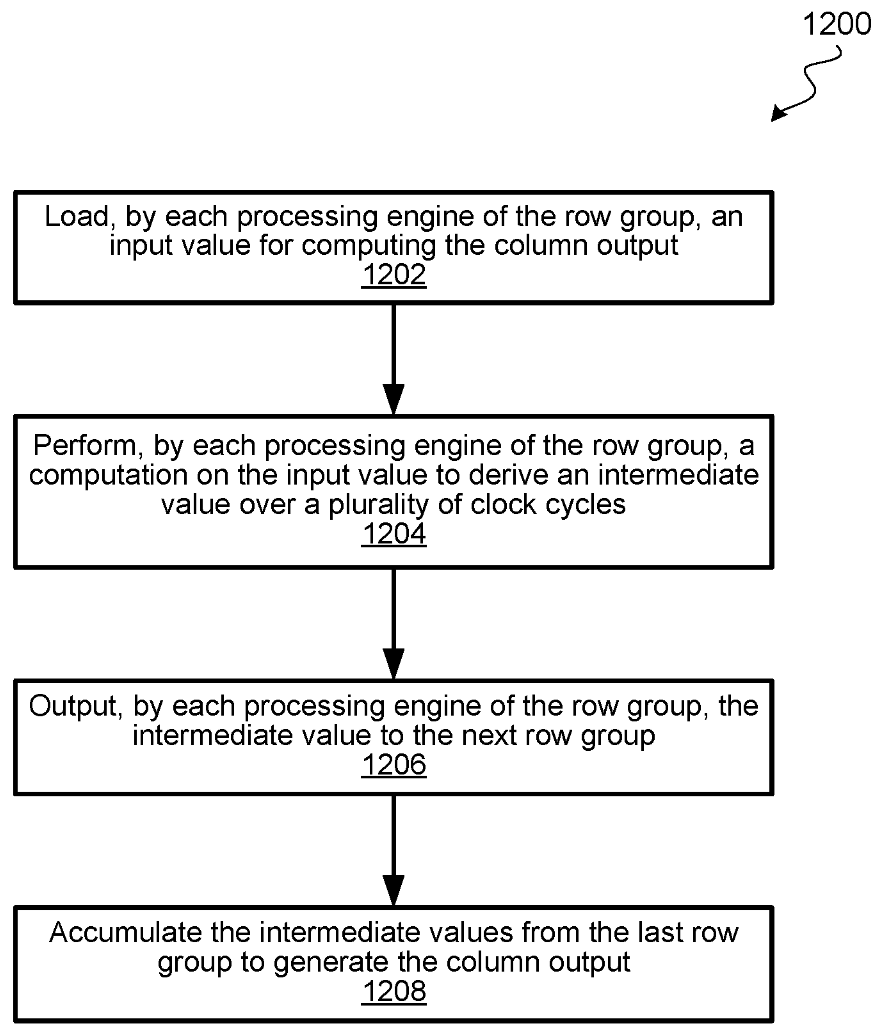
FIG. 12 illustrates a flow diagram of a process for operating a column of a computational array.

FIG. 12 illustrates a flow diagram of an example of a process 1200 for computing a column output in a column of processing engines of an array. The column of processing engines can be organized in row groups, and the operations of blocks 1202, 1204, and 1206 of process 1200 can be performed sequentially by each row group of a series of row groups in the column.

At block 1202, each processing engine of a row group may load an input value that is used for computing the column output. In some implementations the input value may include a feature map input value. The feature map input values for the processing engines of a row group can be loaded, for example, in parallel (during the same clock cycle) similar to FIG. 8, or in a staggered manner similar to FIG. 9. Each processing engine of a row group may also receive a column input such as an initial value or a partial sum input value that is used in the computation of the column output. The input values of the row group can be shifted out in parallel to the corresponding processing engines of the next column of the array at the next clock cycle.

At block 1204, each processing engine of a row group may perform a computation on the input value to derive an intermediate value. The computation can be performed over multiple clock cycles (e.g., at least three clock cycles). For example, the computation on the input value can be performed by a computational logic circuit that includes computational logic distributed across multiple flip-flop stages. This allows the processing engine (and the column/array that the processing engine is part of) to be clocked with a clock signal having a clock period being equal to or greater than a maximum propagation delay between the flip-flop stages of the computational logic circuit.

In some implementations, the computation can be a multiply-and-accumulate computation, and the intermediate value can be a partial sum output. The multiply-and-accumulate computation can be performed, for example, by multiplying the feature map input value with a weight value to derive a multiplication result, and adding the multiplication result to a partial sum input to generate the partial sum output.

At block 1206, each processing engine of a row group may output the computed intermediate value to the corresponding processing engine of the next row group. The operations of blocks 1202, 1204, and 1206 can be repeated sequentially by each row group of the column. In other words, the first row group can perform the operations of blocks 1202, 1204, and 1206; then following the first row group, the second row group can perform the operations of blocks 1202, 1204, and 1206; and so on.

At block 1208, the intermediate values from the last row group in the column can be accumulated to generate the column output. For example, the intermediate values from the last row group can be accumulated by an adder circuit that adds the intermediate values together to generate the column output. Process 1200 can be used to improve the performance of a computational array by allowing the computational array to operate at a faster clock frequency. The computational throughput can be increased and the computational latency can be reduced by forming row groups in a column and introduction additional flip-flop stages in the computational logic.

Figure 13:
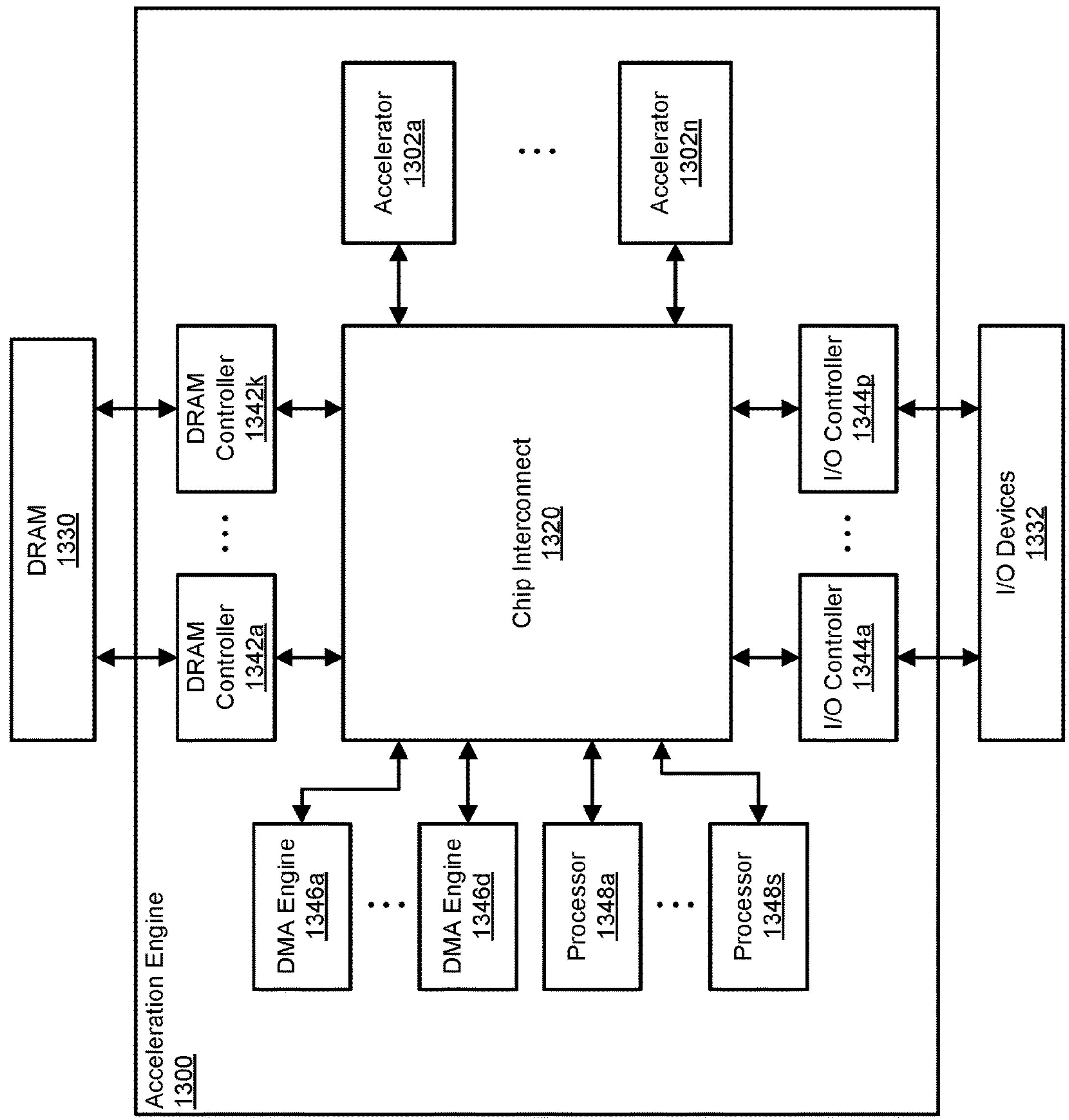
FIG. 13 illustrates a block diagram of an example of an acceleration engine.

FIG. 13 includes a block diagram that illustrates an example of an acceleration engine 1300. The acceleration engine 1300 is an example of an integrated circuit that can include one or more accelerators 1302*a*-1302*n* that may each include a computational array.

In the example of FIG. 13, the acceleration engine 1300 includes multiple accelerators 1302*a*-1302*n*, each of which can perform a set of operations. In various examples, the accelerators 1302*a*-1302*n* are for particular types of operations, so that the accelerators 1302*a*-1302*n* can perform the operations much faster than when similar operations are performed by a general-purpose processor. In various examples, to perform a set of operations, input data on which the operations are to be performed must first be moved into the accelerators 1302*a*-1302*n*. Additionally, in some cases, program code is also moved into the accelerators 1302*a*-1302*n*, which programs the operations that the accelerators 1302*a*-1302*n* will perform on the data. In the illustrated example, the acceleration engine 1300 includes n accelerators 1302*a*-1302*n*. Examples of accelerators that can be included in the acceleration engine 1300 include graphics accelerators, floating point accelerators, neural network accelerators, and others. In various examples, the accelerators 1302*a*-1302*n* can each be the same (e.g., each of the is a graphics accelerator) or can be different (e.g., the accelerators 1302*a*-1302*n* include a graphics accelerator, a floating-point accelerator, and neural network accelerator).

The example acceleration engine 1300 further includes DRAM controllers 1342*a*-1342*k* for communicating with an external memory. The external memory is implemented, in this example, using DRAM 1330. In the illustrated example, the acceleration engine 1300 includes k DRAM controllers 1342*a*-1342*k*, each of which may be able to communicate with an independent set of banks of DRAM. In other examples, other types of RAM technology can be used for the external memory. The DRAM controllers 1342*a*-1342*k* can also be referred to as memory controllers.

In various examples, input data and/or program code for the accelerators 1302*a*-1302*n* can be stored in the DRAM 1330. Different programs can cause the accelerators 1302*a*-1302*n* to perform different operations. For example, when one of the accelerators is a neural network accelerator, one program can configure the neural network accelerator to perform speech recognition while another program can configure the neural network accelerator to perform image recognition. In various examples, different accelerators 1302*a*-1302*n* can be programmed with different programs, so that each performs a different set of operations. In various examples, the processors 1348*a*-1348*s* can manage moving of program code from the DRAM 1330 to the accelerators 1302*a*-1302*n*.

The example acceleration engine 1300 further includes I/O controllers 1344*a*-1344*p* for communicating with I/O devices 1332 in the system. The acceleration engine 1300 can communicate with I/O devices over, for example, a processor bus. In some examples, the processor bus can be implemented using Peripheral Component Interconnect (PCI) and/or a variation of the PCI bus protocol. The processor bus can connect the acceleration engine 1300 to I/O devices such as, for example, input and output devices, memory controllers, storage devices, and/or network interface cards, among other things. In some examples, the I/O controllers 1344-1344*p* can enable the acceleration engine 1300 to act as an I/O device for a host processor. For example, the acceleration engine 1300 can be the recipient of input data from the host processor, and a command indicating an operation to be performed on the input data (e.g., a particular computation or analysis). In the illustrated example, the acceleration engine 1300 includes p I/O controllers 1344*a*-1344*p*, each of which may include a separate root complex and may communicate with a separate set of I/O devices 1332. In other examples, other standardized bus protocols, such as Ultra Path Interconnect (UPI) can be used for the host bus. In other examples, a proprietary bus protocol can be used.

Movement of data in the acceleration engine 1300 can be managed by one or more processors 1348*a*-1348*s*, which can also be referred to as data management processors. In the example of FIG. 13, the acceleration engine 1300 includes s processors 1348*a*-1348*s* incorporated into the device (e.g., on the same silicon die). In other examples, the processors 1348*a*-1348*s* can be external to the acceleration engine 1300 (e.g., on a different die and/or in a different package). In some examples, the processors 1348*a*-1348*s* can manage the movement of data from I/O devices 1332 to the accelerators 1302*a*-1302*n* or the DRAM 1330. For example, input data may be located at an I/O device 1332 or in processor memory, and the processors 1348*a*-1348*s* can move the input from the I/O device 1332 or processor memory into an accelerator or into DRAM 1330. As another example, program code for the accelerators 1302*a*-1302*n* may be located on an I/O device 1332 or in processor memory.

The example acceleration engine 1300 further includes DMA engines 1346*a*-1346*d* that can move data between the accelerators 1302*a*-1302*n*, DRAM controllers 1342*a*-1342*k*, and I/O controllers 1344*a*-1344*p*. In the illustrated example, the acceleration engine 1300 includes d DMA engines 1346*a*-1346*d*. In some implementations, the DMA engines 1346*a*-1346*d* can be assigned to specific tasks, such as moving data from the DRAM controllers 1342*a*-1342*d* to the accelerators 1302*a*-1302*n*, or moving data between the I/O controllers 1344*a*-1344*p* and the accelerators 1302*a*-1302*n*. These tasks can be assigned, for example, by enqueueing descriptors with the DMA engines 1346*a*-1346*d*, where a descriptor identifies an address for a block of data and an operation (e.g., a read or a write) to perform. A descriptor, for example, can direct a DMA engine to instruct a DMA controller to read a block of data from DRAM 1330. A descriptor can, as a further example, instruct the DMA engine to write data, read by the DMA controller, to an accelerator. Further descriptors can be used to move data from an accelerator to DRAM 1330.

In various examples, each of the processors 1348*a*-1348*s* can be responsible for managing the data movement for a different accelerator. In some examples, a processor may manage the data movement for more than one accelerator. Similarly, in various examples, each of the processors 1348*a*-1348*s* can be assigned to one or more DMA engines 1346*a*-1346*d*. In these and other examples, associations between processors 1348*a*-1348*s*, accelerators 1302*a*-1302*n*, and DMA engines 1346*a*-1346*d* are determined by program code being executed by each respective processor.

In the example acceleration engine 1300, the various components can communicate over a chip interconnect 1320. The chip interconnect 1320 primarily includes wiring for routing data between the components of the acceleration engine 1300. In some cases, the chip interconnect 1320 can include a minimal amount of logic, such as multiplexors to control the direction of data, flip-flops for handling clock domain crossings, and timing logic.

Figure 14:
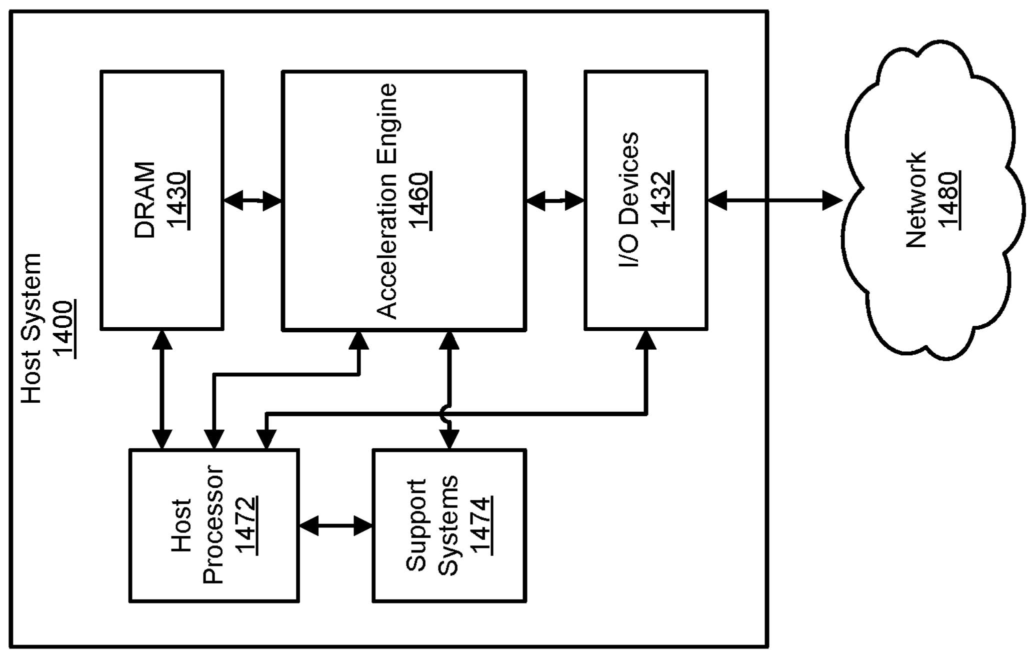
FIG. 14 illustrates a block diagram of an example of a host system.

FIG. 14 includes a block diagram that illustrates an example of a host system 1400 in which an acceleration engine 1460 can be used. The acceleration engine 1460 of FIG. 14 is an example of a device that can include one or more accelerators such as is illustrated in FIG. 11. The example host system 1400 of FIG. 14 includes the acceleration engine 1460, a host processor 1472, DRAM 1430 or processor memory, I/O devices 1432, and support systems 1474. In various implementations, the host system 1400 can include other hardware that is not illustrated here.

The host processor 1472 is a general purpose integrated circuit that is capable of executing program instructions. In some examples, the host processor 1472 can include multiple processing cores. A multi-core processor may include multiple processing units within the same processor. In some examples, the host system 1400 can include more than one host processor 1472. In some examples, the host processor 1472 and the acceleration engine 1460 can be one chip, such as, one or more integrated circuits within the same package.

In various examples, the host processor 1472 can communicate with other components in the host system 1400 over one or more communication channels. For example, the host system 1400 can include a host processor bus, which the host processor 1472 can use to communicate with the DRAM 1430, for example. As another example, the host system 1400 can include an I/O bus, such as a PCI-based bus, over which the host processor 1472 can communicate with the acceleration engine 1460 and/or the I/O devices 1432, for example. In various examples, the host system 1400 can, alternatively or additionally, include other communication channels or busses, such as serial busses, power management busses, storage device busses, and so on.

In some examples, software programs executing on the host processor 1472 can receive or generate input for processing by the acceleration engine 1460. In some examples, the programs can select an appropriate neural network to execute for a given input. For example, a program may be for language translation, and can select one or more neural networks capable of speech recognition and/or machine translation. In these and other examples, the programs can configure the acceleration engine 1460 with the neural network to execute, and/or can select a neural network processing engine on the acceleration engine 1460 that has previously been configured to execute the desired neural network. In some examples, once the acceleration engine 1460 has started an inference on input data, the host processor 1472 can manage the movement of data (such as weights, instructions, intermediate results, results of conditional layers, and/or final results) into or out of the acceleration engine 1460.

In some examples, a software program that is using the acceleration engine 1460 to conduct an inference can read the result from a conditional layer from the acceleration engine 1460 and/or from a storage location, such as in DRAM 1430. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1430 is memory that is used by the host processor 1472 for storage of program code that the host processor 1472 is in the process of executing, as well as values that are being operated on. In some examples, the data for a neural network (e.g., weight values, instructions, and other data) can be all or partially stored in the DRAM 1430. DRAM is a common term for processor memory, and though DRAM is volatile memory, processor memory can be volatile and/or non-volatile. Though not illustrated here, the host system 1400 can include other volatile and non-volatile memories for other purposes. For example, the host system 1400 can include a Read-Only Memory (ROM) that stores boot code for booting the host system 1400 at power on, and/or Basic Input/Output System (BIOS) code.

Though not illustrated here, the DRAM 1430 can store instructions for various programs, which can be loaded into and be executed by the host processor 1472. For example, the DRAM 1430 can be storing instructions for an operating system, one or more data stores, one or more application programs, one or more drivers, and/or services for implementing the features disclosed herein.

The operating system can manage and orchestrate the overall operation of the host system 1400, such as scheduling tasks, executing applications, and/or controller peripheral devices, among other operations. In some examples, a host system 1400 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1400. For example, some drivers can provide communication between the operating system and peripheral devices or I/O devices 1432. Alternatively or additionally, some drivers may provide communication between application programs and the operating system, and/or application programs and peripheral devices accessible to the host system 1400. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1432 can include hardware for connecting to user input and output devices, such as keyboards, mice, pens, tablets, voice input devices, touch input devices, displays or monitors, speakers, and printers, among other devices. The I/O devices 1432 can also include storage drives and/or network interfaces for connecting to a network 1480. For example, the host system 1400 can use a network interface to communicate with storage devices, user terminals, other computing devices or servers, and/or other networks, among various examples.

In various examples, one or more of the I/O devices 1432 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1400 or may be in an external enclosure. A storage device can be fixed (e.g., attached by screws) or removable (e.g., having a physical release mechanism and possibly a hot-plug mechanism).

Storage devices, the DRAM 1430, and any other memory component in the host system 1400 are examples of computer-readable storage media. Computer-readable storage media are physical mediums that are capable of storing data in a format that can be read by a device such as the host processor 1472. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1432 can be PCI-based devices. In these examples, a PCI-based I/O device includes a PCI interface for communicating with the host system 1400. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1474 can include hardware for coordinating the operations of the acceleration engine 1460. For example, the support systems 1474 can include a microprocessor that coordinates the activities of the acceleration engine 1460, including moving data around on the acceleration engine 1460. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1472. In some examples, the program executed by the microprocessor is stored on the hardware of microprocessor, or on a non-volatile memory chip in the host system 1400. In some examples, the microprocessor and the acceleration engine 1460 can be on chip, such as one integrated circuit on the same die and in the same package.

In some examples, the support systems 1474 can be responsible for taking instructions from the host processor 1472 when programs executing on the host processor 1472 request the execution of a neural network. For example, the host processor 1472 can provide the support systems 1474 with a set of input data and a task that is to be performed on the set of input data. In this example, the support systems 1474 can identify a neural network that can perform the task, and can program the acceleration engine 1460 to execute the neural network on the set of input data. In some examples, the support systems 1474 only needs to select an appropriate neural network processing engine of the neural network processor. In some examples, the support systems 1474 may need to load the data for the neural network onto the acceleration engine 1460 before the acceleration engine 1460 can start executing the neural network. In these and other examples, the support systems 1474 can further receive the output of executing the neural network, and provide the output back to the host processor 1472.

In some examples, the operations of the support systems 1474 can be handled by the host processor 1472. In these examples, the support systems 1474 may not be needed and can be omitted from the host system 1400.

In various examples, the host system 1400 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1400 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A neural network processor comprising:
an array of processing engines having a plurality of columns each configured to generate a column sum output, wherein each of the columns includes:
a plurality of row groups each having a plurality of non-adjacent processing engines along the column, wherein each processing engine of the plurality of non-adjacent processing engines in a row group includes multiplication logic and addition logic distributed across one or more flip-flop stages, each processing engine configured to perform operations including:
receiving a feature map input value for computing the column sum output;
multiplying the feature map input value with a weight value to generate a multiplication result;
adding the multiplication result to a partial sum input to generate a partial sum output over a plurality of clock cycles; and
outputting the partial sum output from the processing engine to a next row group; and
a column adder to add partial sum outputs from a last row group to generate the column sum output.

2. The neural network processor of claim 1, wherein the array is configured to be clocked with a clock signal having a clock period being equal to or greater than a maximum propagation delay between flip-flop stages of the addition logic.

3. The neural network processor of claim 1, wherein the partial sum output is generated over at least three clock cycles.

4. The neural network processor of claim 1, wherein the addition logic is distributed across the one or more flip-flop stages by a synthesis tool.

5. An integrated circuit device comprising:
an array of processing engines having a plurality of columns each configured to generate a column output, wherein each column in the plurality of columns includes:
a plurality of row groups each having a plurality of non-adjacent processing engines along the column, wherein each processing engine of the plurality of non-adjacent processing engines in a row group includes a computational circuit and is configured to perform operations including:
receiving an input value for computing the column output;
performing a computation on the input value over a plurality of clock cycles using the computational circuit to derive an intermediate value; and
outputting the intermediate value from the processing engine to a next row group; and
a column accumulator to accumulate intermediate values outputted from a last row group to generate the column output.

6. The integrated circuit device of claim 5, wherein the computation is a multiply-and-accumulate computation.

7. The integrated circuit device of claim 6, wherein the column accumulator is an adder circuit.

8. The integrated circuit device of claim 6, wherein the multiply-and-accumulate computation is performed over at least three clock cycles.

9. The integrated circuit device of claim 6, wherein the input value is a feature map input value, the intermediate value is a partial sum output, and the multiply-and-accumulate computation is performed by multiplying the feature map input value with a weight value to derive a multiplication result, and by adding the multiplication result to a partial sum input to generate the partial sum output.

10. The integrated circuit device of claim 9, wherein each processing engine of the plurality of non-adjacent processing engines includes a feature map input buffer, a partial sum input buffer, and a weight input buffer coupled to a weight register.

11. The integrated circuit device of claim 10, wherein each processing engine of the plurality of non-adjacent processing engines includes a multiplier circuit coupled to an output of the feature map input buffer and an output of the weight register.

12. The integrated circuit device of claim 11, wherein each processing engine of the plurality of non-adjacent processing engines includes an adder circuit coupled to an output of the partial sum input buffer and an output of the multiplier circuit.

13. The integrated circuit device of claim 5, wherein the computational circuit includes computational logic distributed across multiple flip-flop stages.

14. The integrated circuit device of claim 13, wherein the computational logic includes addition logic that is distributed across the multiple flip-flop stages.

15. The integrated circuit device of claim 13, wherein the array of processing engines is configured to be clocked with a clock signal having a clock period being equal to or greater than a maximum propagation delay between the flip-flop stages of the computational circuit.

16. The integrated circuit device of claim 5, wherein the plurality of non-adjacent processing engines of a row group are configured to receive their input values belonging to a vector of an input matrix in parallel.

17. The integrated circuit device of claim 5, wherein each processing engine of a row group is configured to receive sequential input values on non-adjacent clock cycles.

18. The integrated circuit device of claim 5, wherein each processing engine of a row group is configured to output sequential intermediate values to a next row group on non-adjacent clock cycles.

19. A method for computing a column output in a column of processing engines of an array, wherein the column has a series of row groups that each include a plurality of non-adjacent processing engines along the column, the method comprising:
sequentially performing, by each row group in the series of row groups of the column:
loading, by each processing engine of the row group, an input value for computing the column output;
performing, by each processing engine of the row group, a computation on the input value to derive an intermediate value over a plurality of clock cycles; and
outputting, by each processing engine of the row group, the intermediate value to a next row group; and
accumulating intermediate values from a last row group to generate the column output.

20. The method of claim 19, wherein sequential input values being loaded into a processing engine are separated by a plurality of clock cycles.

* * * * *